(12) United States Patent
Yoshida et al.

(10) Patent No.: US 7,103,979 B2
(45) Date of Patent: Sep. 12, 2006

(54) PORTABLE ELECTRIC CUTTING DEVICE WITH BLOWER MECHANISM

(75) Inventors: Kenichirou Yoshida, Hitachinaka (JP); Hideyuki Tanimoto, Hitachinaka (JP); Tomomasa Nishikawa, Hitachinaka (JP); Shinji Takano, Hitachinaka (JP); Takuma Nonaka, Hitachinaka (JP); Kenji Niwa, Hitachinaka (JP); Teruo Imai, Hitachinaka (JP); Satoshi Shimada, Nagasaki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 28 days.

(21) Appl. No.: 10/688,909

(22) Filed: Oct. 21, 2003

(65) Prior Publication Data

US 2004/0107584 A1 Jun. 10, 2004

(30) Foreign Application Priority Data

| Oct. 22, 2002 | (JP) | P2002-307696 |
| May 8, 2003 | (JP) | P2003-130820 |
| May 8, 2003 | (JP) | P2003-130821 |
| May 8, 2003 | (JP) | P2003-130822 |
| Sep. 30, 2003 | (JP) | P2003-339939 |
| Sep. 30, 2003 | (JP) | P2003-339940 |

(51) Int. Cl.
*B23D 47/02* (2006.01)

(52) U.S. Cl. ............... 30/376; 30/388; 30/391

(58) Field of Classification Search .......... 30/124, 30/376, 377, 388, 389, 390, 391, 374
See application file for complete search history.

(56) References Cited

U.S. PATENT DOCUMENTS

| 3,267,974 | A | * | 8/1966 | Elson .................. 30/377 |
| 4,589,208 | A | * | 5/1986 | Iwasaki et al. ........... 30/376 |
| 5,084,971 | A | | 2/1992 | Remington et al. |
| 5,461,790 | A | * | 10/1995 | Olstowski ................. 30/391 |
| 5,539,985 | A | | 7/1996 | Wershe |
| 5,634,274 | A | * | 6/1997 | Ohkouchi et al. ........ 30/124 |
| 5,675,895 | A | * | 10/1997 | Mori et al. .............. 30/124 |
| 5,701,676 | A | * | 12/1997 | Itoh ....................... 30/388 |
| 6,173,499 | B1 | * | 1/2001 | Hegoas et al. ........... 30/123.3 |
| 6,308,424 | B1 | * | 10/2001 | Stielper ................... 30/391 |
| 6,584,695 | B1 | * | 7/2003 | Chang .................... 30/391 |
| 2003/0047050 | A1 | * | 3/2003 | Onose et al. ............. 83/469 |
| 2004/0049927 | A1 | * | 3/2004 | Wu ........................ 30/391 |
| 2004/0093743 | A1 | * | 5/2004 | Fukuoka .................. 30/391 |

FOREIGN PATENT DOCUMENTS

| DE | 35 00 371 | 7/1986 |
| DE | 41 21 989 | 1/1993 |

(Continued)

OTHER PUBLICATIONS

German Office Action dated May 12, 2004.

*Primary Examiner*—Hwei-Siu C. Payer
(74) *Attorney, Agent, or Firm*—McGuireWoods LLP

(57) ABSTRACT

Fanned air generated by a fan to cool a motor is discharged from a housing through fanned air discharge ports toward an opening formed in a base. The fanned air discharged toward the opening is then introduced into a groove in fluid communication with the opening. The groove is formed in a bottom surface of the base and has an open side at a front side of the base. The fanned air is then discharged from the front side of the base, blowing off saw dust on a cutting object so as to prevent dust from accumulating on a marking line on the cutting object.

38 Claims, 31 Drawing Sheets

FOREIGN PATENT DOCUMENTS

| | | |
|---|---|---|
| JP | 55-154101 | 4/1979 |
| JP | 2543298 | 4/1997 |
| JP | 2607480 | 6/2001 |
| JP | 2002-316301 | 10/2002 |
| JP | 2003-11101 | 1/2003 |

* cited by examiner

PORTABLE ELECTRIC CUTTING DEVICE WITH BLOWER MECHANISM

BACKGROUND OF THE INVENTION

1. Field of the Invention

The present invention relates to a portable electric cutting machine, and more particularly to a portable electric cutting machine provided with an air-discharge mechanism for discharging air from a housing into a saw blade housing section of a saw cover.

2. Related Art

When cutting a cutting object, such as timber, by using a portable electric cutting machine (hereinafter referred to as "portable electric circular saw"), a marking line is drawn on the cutting object and then the object is cut along the marking line for the purpose of improving the cutting accuracy. More specifically, a guide piece for indicating the edge position of the saw blade is disposed at the front end of a base so that the guide piece locates on an imaginary line extended in a cutting direction from the saw blade. A user can cut the cutting object while directly confirming the positional relationship between the blade edge of the saw blade and the marking line on the cutting object. Alternatively, the user can cut the cutting object while indirectly confirming the positional relationship between the blade edge of the saw blade and the marking line by aligning the guide piece with the marking line.

However, when the bottom surface of the base slides on the cutting object, the marked line may be blurred or erased due to friction between the bottom surface of the base and the upper surface of the cutting objects, disabling the user to confirm the positional relationship between the blade edge and the marking line. Also, if ink of the marking line transfers onto the bottom surface when sliding, then the ink may get back to the cutting object so that the cutting object gets dirty.

Further, if a large volume of saw dust produced during the cutting operation piles on the cutting object, the marking line becomes invisible. In this case, the user can no longer confirm the positional relationship between the blade edge of the saw blade and the marking line, resulting in degradation of cutting accuracy and decreasing in cutting efficiency.

Saw dust accumulates on the cutting object when, for example, the saw dust produced in the cutting operation flies up and then falls down on the cutting object. Therefore, it is conceivable to use a dust collector for collecting saw dust generated during cutting operation, thereby preventing saw dust from flying up during the cutting operation. However, dust can be produced during, not only cutting operations, but also other operations using various other tools. In this case, even if such a dust collector is used during cutting operations, dust may accumulate on the cutting object to hide the marking line. In this case, a user needs to wipe off or blow off the dust on the cutting object before starting a cutting operation so that the user can see the marking line. This reduces the efficiency of the cutting operation. Also, the user needs to stop the cutting operation to remove saw dust which has been generated and piled on the cutting object during the cutting operation. This reduces both the cutting accuracy and the efficiency of the cutting operation.

Japanese Utility Model registration No. 2607480 discloses a conventional portable electric circular saw, which includes a saw blade, a motor that drives the saw blade, a housing that houses the motor, a saw cover attached to the housing, a base linked to the housing, and a fan. The saw cover has a saw blade housing section that houses the upper half of the outer periphery of the saw blade. The base has a bottom surface that slides on the cutting object. The fan is driven by the motor for generating an air current (hereinafter referred to as "fanned air") to cool the motor. A wall of the saw cover that is positioned between the fan and the saw blade housing section is formed with fanned air discharge ports for discharging the fanned air into the saw blade housing section. The fanned air discharge ports are defined by a plurality of division walls.

Each division wall has a surface extending in parallel with a rotary shaft of the fan and in a radial direction of the rotary shaft. Thus, as passing through the fanned air discharge ports, the fanned air is directed to flow in a direction parallel to the rotary shaft of the fan and then discharged into the saw blade housing section. The fanned air discharged into the saw blade housing section in this manner collides with the lateral surface of the saw blade housed in the saw blade housing section and the lateral surface of a safety cover, which is rotatably disposed so that the saw blade housing section can house the safety cover during cutting operations. Then, the fanned air diffuses along the lateral surfaces of the saw blade and the safety cover. The diffused fanned air is then discharged to the outside of the saw cover through either between the inner wall of the saw cover and the saw blade or between the inner wall of the saw cover and the safety cover. Since the fanned air collides with the lateral surfaces of the saw blade and the safety cover substantially at a right angle, the collided fanned air diffuses substantially uniformly across wide area of the surfaces. The fanned air may be discharged from the rear side of the saw cover in the cutting direction due to air current, which is produced by rotation of the saw blade in the saw blade housing section.

The fan is a centrifugal fan. Fanned air generated by the centrifugal fan flows outwardly in radial directions of the centrifugal fan, swirls along the inner wall of the housing, and then is discharged into the saw blade housing section through the fanned air discharge ports. The flow rate and the amount of the fanned air discharged through the fanned air discharge ports are higher in areas close to the rotary axis of the fan and lower in areas remote from the rotary axis with respect to the radial directions of the fan. This arises a problem of generation of noise in radially remote areas. This problem can be overcome by downsizing the fan or reducing the rotation speed of the fan. However, this results in reducing the flow rate of the fanned air, thereby degrading the cooling performance of the fan.

Japanese Utility Model Application-Publication No. SHO-55-154101 discloses a portable electric circular saw that includes a cylindrical guide pipe disposed at the outside of a saw cover along a housing. The guide pipe is in communication with fanned air discharge ports. Fanned air discharged from the fanned air discharge ports is guided through the guide pipe to the top surface of a cutting object and blows off saw dust from the cutting object. In this manner, the saw dust and other dust are prevented from accumulating on the cutting object.

However, the guide pipe becomes an obstacle when confirming the positional relationship between the marking line and the blade edge of the saw blade, reducing the visibility of the marking line. Additionally, the assembling efficiency falls and the cost rises because of the increased number of the components.

When the cutting operation is performed, for example, in a closed area with limited space or in a room with painted walls still wet, blowing the fanned air to disperse the saw dust may not be preferable.

SUMMARY OF THE INVENTION

In the view of foregoing, it is an object of the present invention to overcome the above problems, and also to provide a portable electric circular saw that prevents the marking line from being blurred or erased during cutting operation, enabling a user to reliably confirm the positional relationship between a blade edge of a saw blade and a marking line on a cutting object during the operations.

Another object of the present invention is to provide a portable electric circular was that can effectively prevent accumulation of dust on an cutting object by using fanned air generated for cooling a motor so as to improve cutting accuracy and cutting efficiency.

Still another object of the present invention is to provide a portable electric circular saw that can selectively prevent dust from being dispersed by the fanned air, without increasing the number of components.

Still another object of the present invention is to provide a portable electric circular saw that can suppress the generation of noise without reducing the cooling performance of the fan.

In order to attain the above and other objects, the present invention provides a portable electric cutting device including a saw blade that cuts a cutting object in a cutting direction, a casing that partially houses the saw blade, and a base linked to the casing. The base has a bottom surface that slides on the cutting object. The bottom surface is formed with an opening through which the saw blade projects downward beyond the bottom surface. The bottom surface is formed with a first groove extended forward in the cutting direction from a front end of the opening to a front end of the base. The first groove is in fluid communication with the opening and being opened to the front end of the base.

PREFERRED EMBODIMENTS OF THE PRESENT INVENTION

Next, portable electric circular saws according to embodiments of the present invention will be described with reference to the accompanying drawings. First, a portable electric circular saw according to a first embodiment of the present invention will be described with reference to FIGS. 1–28.

(1) Basic Configuration

Figure 1:
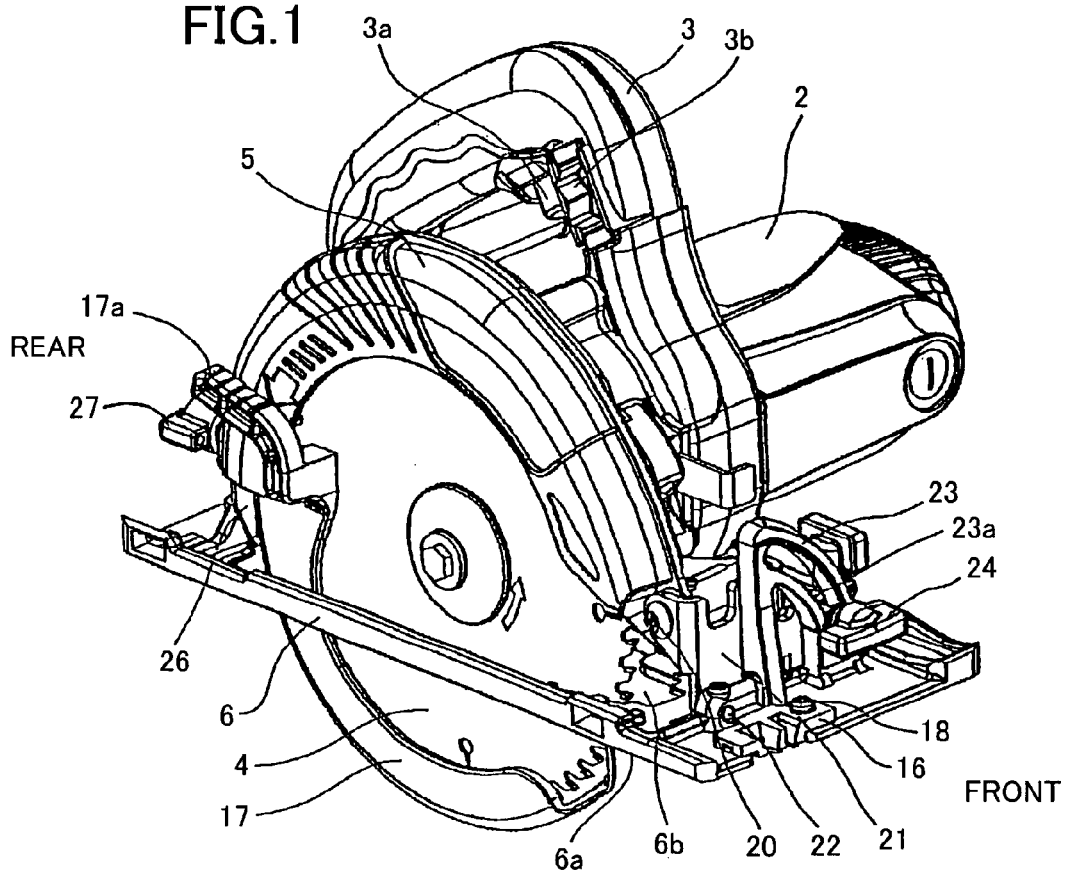
FIG. 1 is a schematic perspective view of a portable electric circular saw according to a first embodiment of the present invention.
Figure 2:
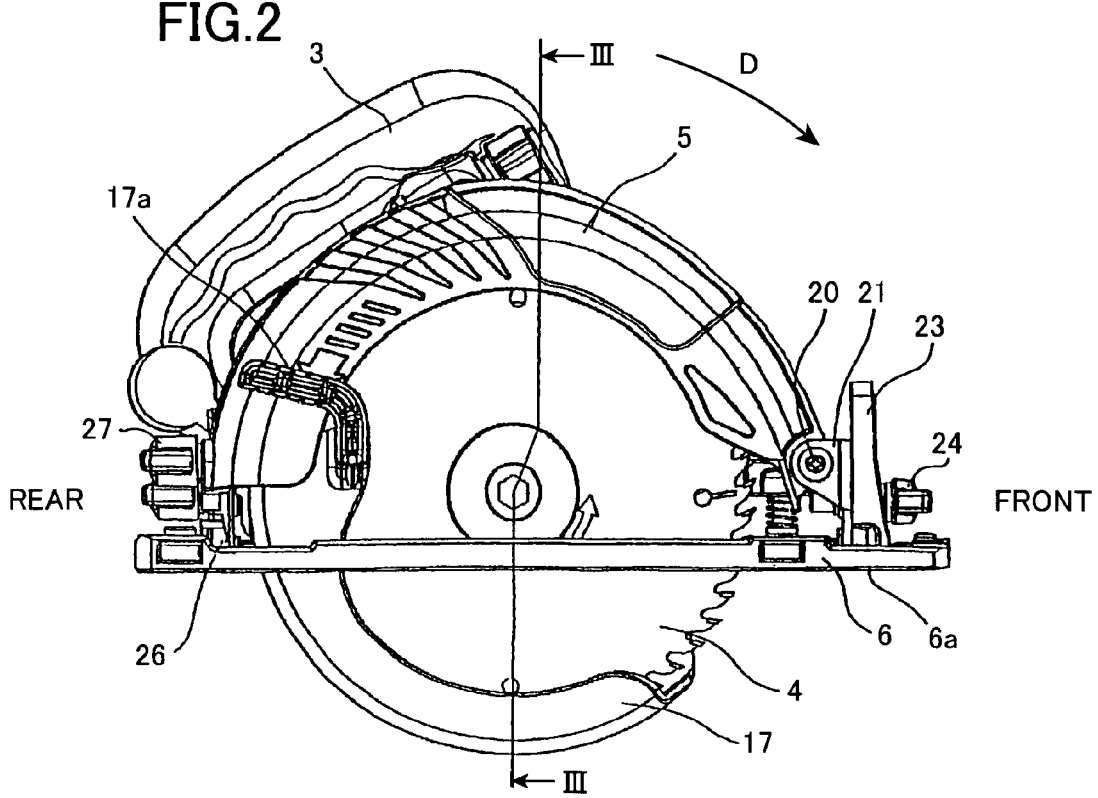
FIG. 2 is a schematic front view of the portable electric circular saw according to the first embodiment of the preset invention.
Figure 3:
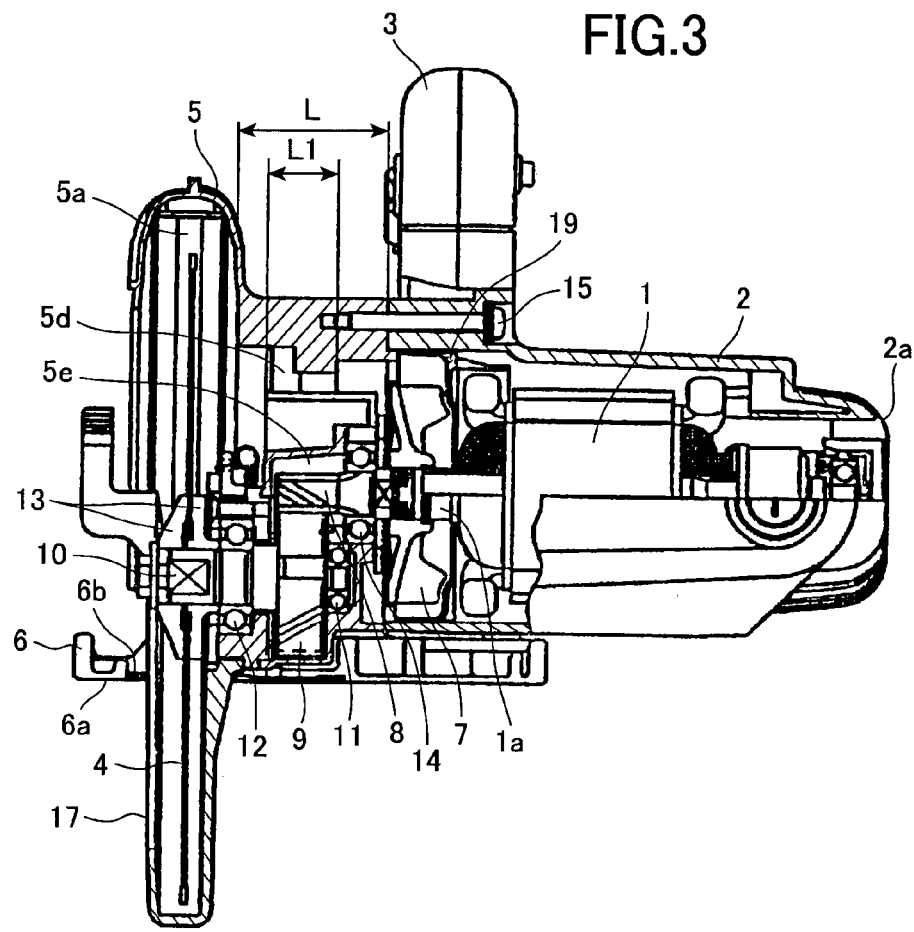
FIG. 3 is a schematic cross sectional view of the portable electric circular saw taken along a line III–III in FIG. 2.
Figure 15:
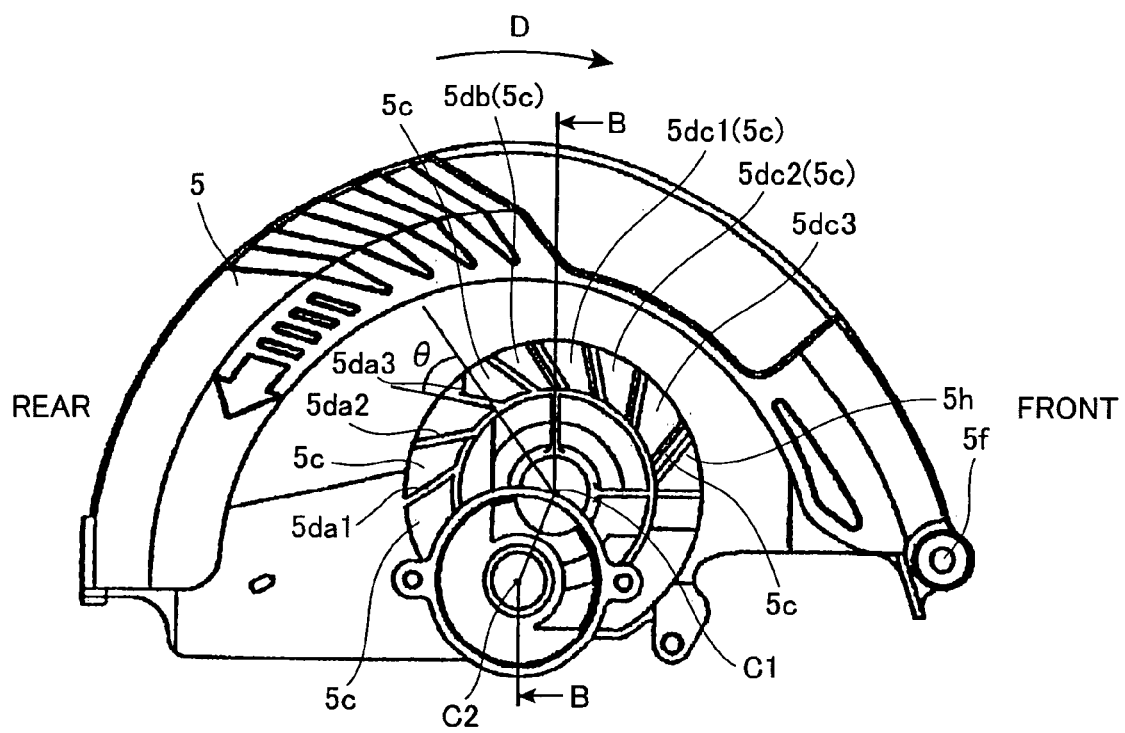
FIG. 15 is a schematic front view of the saw cover of the portable electric circular saw of the first embodiment.

As shown in FIGS. 1–3, the portable electric circular saw of the present embodiment includes a motor 1, a housing 2, a handle 3, a saw blade 4, a saw cover 5, a base 6, and a fan 7. The motor 1 drives the saw blade 4 to rotate. The housing supports and houses the motor 1. The handle 3 is formed integral with the housing 2 or linked to the housing 2 as a separate member. A user can turn ON and OFF the motor 1 through operation on a switch 3a of the handle 3. The saw cover 5 is attached to the housing 2 and has a saw blade housing section 5a. The saw blade 4 has a fan-side lateral surface facing the fan 7 and a housing-section-side lateral surface facing the saw blade housing section 5a. The saw blade housing section 5a partially houses the upper half peripheral portion of the saw blade 4 and the fan-side lateral surface of the saw blade 4. The base 6 is linked to the housing 2 by the saw cover 5 and has a bottom surface 6a that slides on a cutting object. The base 6 is formed with an opening 6b through which the saw blade 4 is projected downward beyond the surface 6a. The fan 7 is fixed to an output shaft 1a of the motor 1 so that the fan 7 rotates as the motor 1 drives to rotate. The rotation of the fan 7 generates fanned air to cool the motor 1. As shown in FIG. 15, fanned air discharge ports 5c are formed in a wall of the saw cover 5 located between the fan 7 and the saw blade housing section 5a for discharging the fanned air from the housing 2 into the saw blade housing section 5a. The fanned air discharge ports 5c are defined by a plurality of division walls 5d.

As shown in FIG. 3, one end of the housing 2 is formed with an air intake port 2a, through which internal space of the housing 2 is in fluid communication with external space. Rotation of the fan 7 draws air into the housing 2 through the air intake port 2a. The air passes by the outer periphery of the motor 1 as the fanned air and cools the motor 1. That is, the fan 7 is provided to cool the motor 1 with fanned air. It should be noted that the fan 7 rotates in a direction indicated by an arrow D in FIG. 2 (hereinafter referred to as "rotation direction D").

A pinion gear 8 is disposed at an end of the output shaft 1a of the motor 1. The pinion gear 8 may be formed integral with the output shaft 1a or as a component separated from the output shaft 1a. The pinion gear 8 is in a meshing engagement with a gear 9 that is rotatably supported by the saw cover 5. The gear 9 is fixed to a drive shaft 10 that is coaxial with the gear 9 so that the gear 9 rotates together with the rotation of the drive shaft 10. The drive shaft 10 is rotatably supported by the saw cover 5 via bearings 11, 12, which are coaxial with the gear 9 and sandwich the gear 9 therebetween. A pair of saw blade locking members 13 are attached to the drive shaft 10. The saw blade locking members 13 are not rotatable relative to the drive shaft 10 and pinch the saw blade 4 therebetween. With this configuration, the driving power of the motor 1 is transmitted via the output shaft 1a, the pinion gear 8, the gear 9, the drive shaft 10, and the saw blade locking members 13 to the saw blade 4, enabling the saw blade 4 to cut the cutting object. Here, while transmitting the driving power of the motor 1 to the saw blade 4, the pinion gear 8 and the gear 9 reduce the driving power by a certain degree. The rotation direction of the saw blade 4 is opposite to the rotation direction D of the fan 7.

The portable electric circular saw further includes a safety cover 17 supported by the drive shaft 10 coaxially with the same. The safety cover 17 covers substantially a half of the outer periphery of the saw blade 4 and can be contained in the saw blade housing section 5a. The safety cover 17 has a lever 17a. The safety cover 17 is urged by an urging member (not shown), such as a spring. FIG. 1 shows the initial state of the safety cover 17, where the most part of the safety cover 17 projects downward beyond the bottom surface 6a of the base 6 so as to prevent the outer periphery of the saw blade 4 from being exposed. When a cutting operation is conducted, the front end (right end in FIG. 2) of the safety cover 17 abuts the rear end of the cutting object. As the user slides the portable electric circular saw on the cutting object in the cutting direction, the safety cover 17 rotates and enters the saw blade housing section 5a against the urging force of the urging member, exposing the saw blade 4 at the bottom surface 6a of the base 6. In the case of cutting out a piece from the cutting object without cutting any edges of the cutting object, the user can rotate the safety cover 17 by operating the lever 17a to expose the saw blade 4 at the bottom.

The saw cover 5 has a pinion gear housing section 5e in a substantially circular shape for housing the pinion gear 8. A bearing 14 for rotatably supporting the pinion gear 8 is press-fitted to the saw cover 5 so as to place the pinion gear 8 substantially at the center of the pinion gear housing section 5e.

A side surface of the saw cover 5 is attached to the side surface of the housing 2 by screws 15. The pinion gear housing section 5e is disposed between the saw blade housing section 5a and the housing 2 for housing the gear 9 therein. That is, the space between the saw blade housing section 5a and the housing 2 serves as a gear casing. As shown in FIG. 2, the saw cover 5 is linked to the base 6 such that the saw cover 5 sandwiches the saw blade 4 at the front and rear ends of the base 6. A saw blade inclination regulating mechanism and a saw blade cutting depth regulating mechanism are arranged at the link section.

(2) Saw Blade Inclination Regulating Mechanism

The saw blade inclination regulating mechanism includes a front inclination regulating mechanism located near the front end of the base 6 as viewed in the cutting direction and a rear inclination regulating mechanism located near the rear end of the base 6. As shown in FIG. 1, the front inclination regulation mechanism includes a rotary shaft 20, a hinge holding section 21, a bevel plate 23, and a bolt 24, whereas the rear inclination regulating mechanism includes a pin 25, a link 26, a bolt 27, a bevel plate 28, and a bolt 29.

First, the front inclination regulating mechanism will be described with reference to FIGS. 1 and 4–6. The pin 22 is rigidly fitted to the base 6 at a position near the front end of the base 6 in the cutting direction. The pin 22 extends in a direction perpendicular to the rotary shaft of the saw blade 4. The pin 22 serves as a first fulcrum of inclination. The bevel plate 23 extends substantially in parallel with the front edge of the base 6 and in the upward direction from the base 6. The bevel plate 23 is formed with an arc-shaped through hole 23a on an imaginary circular line centered at the axial center of the pin 22. The hinge holding section 21 is rotatable about the pin 22 both rightward and leftward relative to the base 6. The hinge holding section 21 is engaged with the bolt 24 that is inserted through the through hole 23a. The angular position of the hinge holding section 21 is fixed by tightening the bolt 24. That is, the user can loose the bolt 24 and lift up the housing 2, rotating the hinge holding section 21 about the pin 22, to bring the hinge holding section 21 from the posture shown in FIG. 5 into the inclined posture shown in FIG. 6. The user can maintain the inclined posture of the hinge holding section 21 by tightening the bolt 24.

Figure 4:
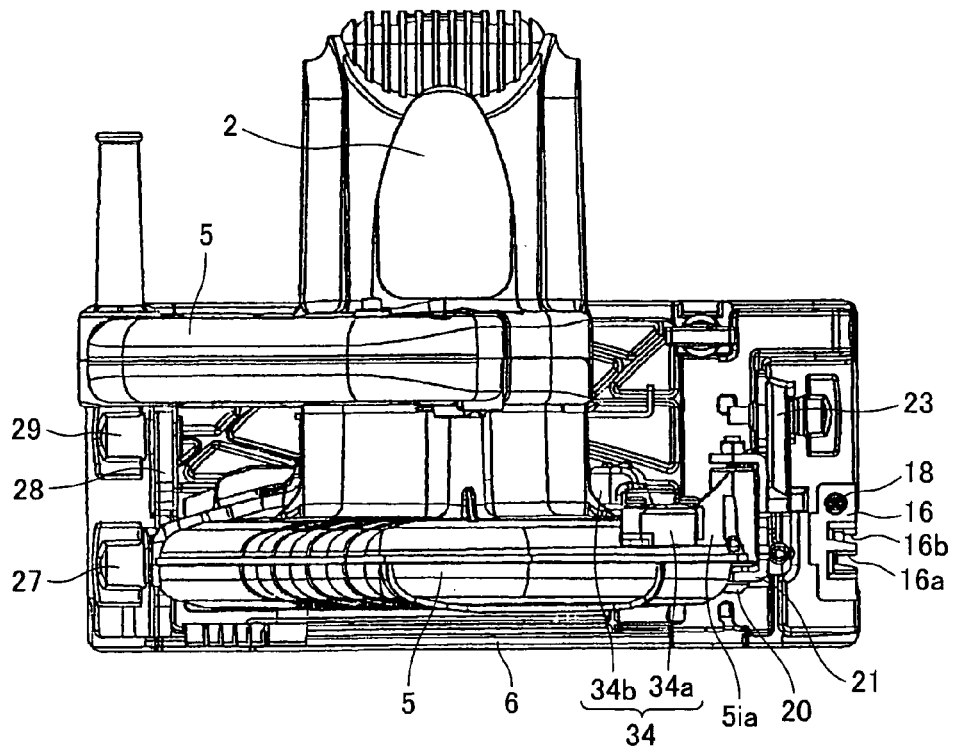
FIG. 4 is a schematic plan view of the portable electric circular saw of FIG. 1.

The hinge holding section 21 has a substantially U-shape that pinches the front end of the saw cover 5 from the right and the left (FIG. 4). The rotary shaft 20 is rotatably supported by the hinge holding section 21. The saw cover 5 is formed with a hole 5f at the front portion (FIG. 15) that extends substantially in parallel with the rotary shaft of the saw blade 4. The rotary shaft 20, which is rotatably supported by the hinge holding section 21, is inserted into the hole 5f, so that the saw cover 5 can pivot up and down about the rotary shaft 20 relative to the hinge holding section 21.

Figure 7:
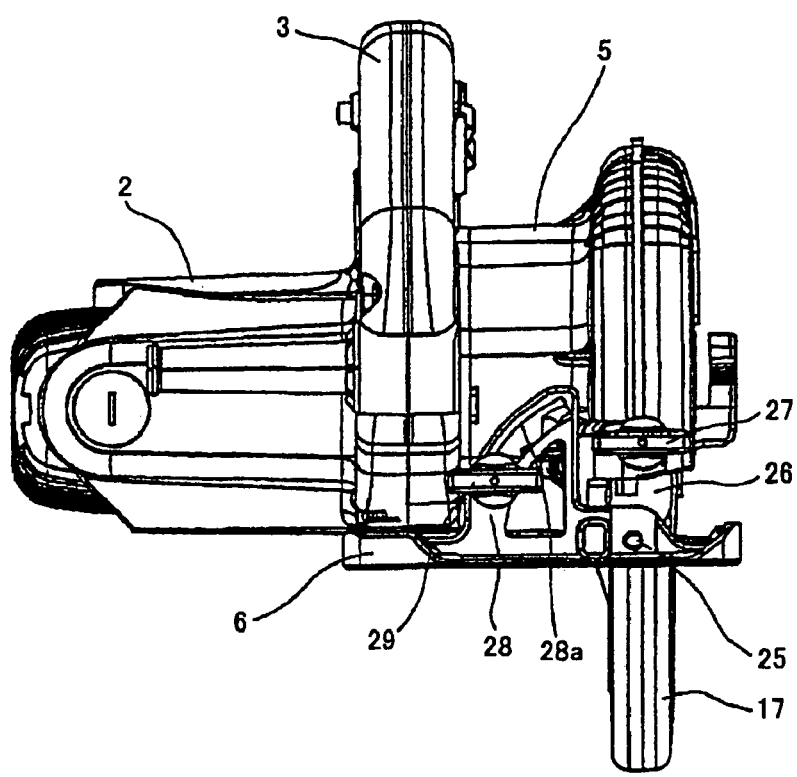
FIG. 7 is a schematic left-side view of the portable electric circular saw according to the first embodiment.
Figure 8:
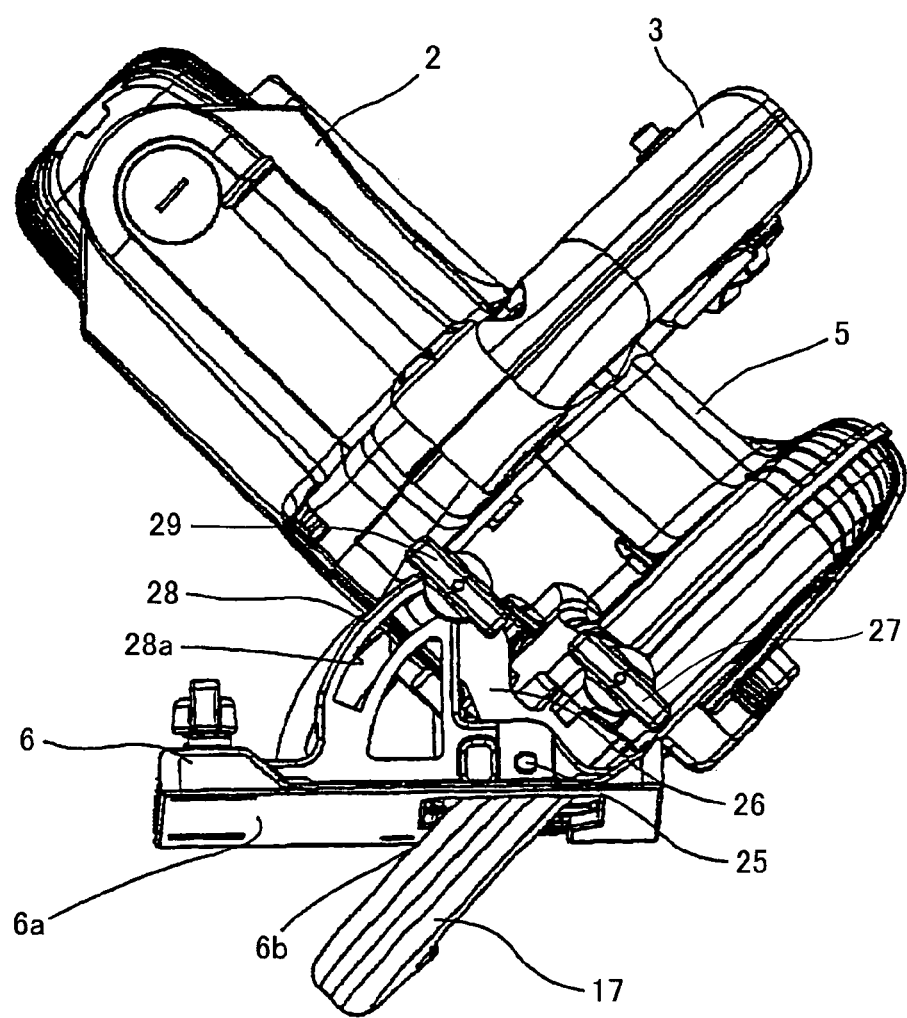
FIG. 8 is a schematic left-side view of the portable electric circular saw according to the first embodiment with the saw blade tilted with respect to the bottom surface of the base by 45 degree.

Next, the rear inclination regulating mechanism will be described with reference to FIGS. 7 and 8. The pin 25 extends in a direction substantially parallel to the upper surface of the base 6 and perpendicular to the rotary shaft of the saw blade 4. The pin 25 serves as a second fulcrum of inclination. The pins 25 and 22 are arranged such that a virtual line connecting the pin 25 and the pin 22 extends substantially in parallel with the lateral surfaces of the saw blade 4. The link 26 is linked to the pin 25 and pivotable about the pin 25 to the right and the left of the base 6. The bevel plate 28 extends substantially in parallel with the rear edge of the base 6 and protrudes upward from the base 6. The bevel plate 28 is formed with an arc-shaped through hole 28a on an imaginary circular line centered at the pin 25. The link 26 is engaged with the bolt 29 that is inserted through the through hole 28a so that the angular position of the link 26 is fixed by tightening the bolt 29.

Figure 6:
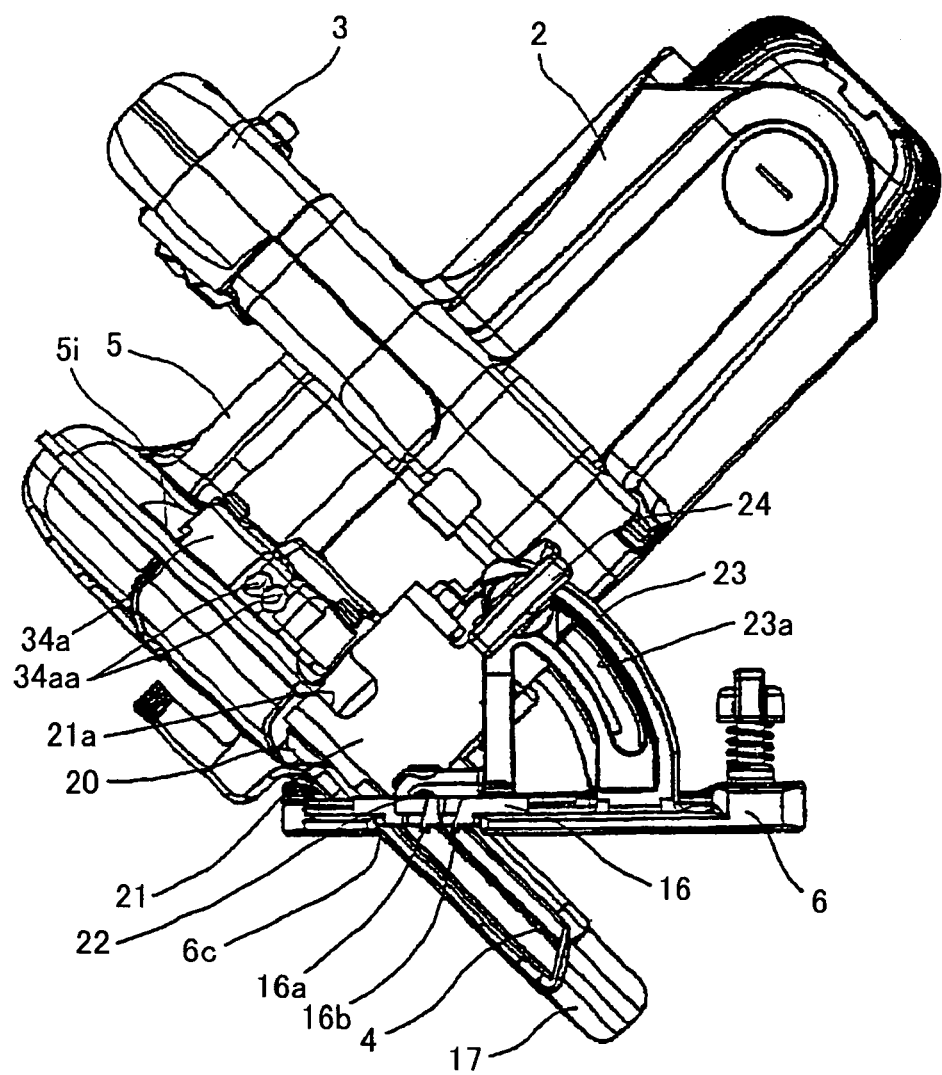
FIG. 6 is a schematic right-side view of portable electric circular saw according to the first embodiment with a saw blade tilted with respect to a bottom surface of a base by 45 degree.

As mentioned above, the saw cover 5 and the base 6 are linked to each other by the pins 22 and 25 serving as the first and second fulcrums. With this configuration, the saw cover 5 can pivot relative to the base 6 about the pins 22 and 25. This inclination of the saw cover 5 inclines the saw blade 4 relative to the bottom surface 6a of the base 6. FIGS. 6 and 8 schematically indicate the saw cover 5 pivoted about the pins 22 and 25 so that the lateral surfaces of the saw blade 4 tilts with respect to the bottom surface 6a of the base 6 by 45 degree, which is the maximum angle in the present embodiment, The hinge holding section 21 and the link 26 can pivot within a range defined by the holes 23a, 28a of the bevel plates 23, 28. In other words, the hinge holding section 21 pivots along the wall surfaces of the bevel plate 23, 28 that face the saw blade 4 (rear side surface of the bevel plate 23 and the front side surface of the bevel plate 28). These wall surfaces of the bevel plates 23, 28 (in particular the wall surface of the bevel plate 23) are machined to improve the planar accuracy, and the hinge holding section 21 and the link 26 are designed to partially abut the wall surfaces of the bevel plates 23, 28, so as to ensure the accurate positional relationship between the saw cover 5 and the base 6 when pivoted about the pin 22 and the pin 25.

Because the handle 3 is located remote from the saw blade 4, the load applied to the handle 3 operates to pivot the saw cover 5 and the housing 2 relative to the base 6. Therefore, it is preferable that the bevel plate 23 and the bevel plate 28 are arranged near the front and rear ends of the base 6, respectively, as viewed in the cutting direction as described above. This arrangement can prevent the cutting depth from unintentionally and abruptly changed, and effectively prevent the angle (orientation) of the saw blade 4 from being accidentally changed due to a load applied to the portable electric circular saw, securing positional accuracy of the pivoted saw blade 4. However, only one of the bevel plates may be provided. For example, only the bevel plate 23 may be arranged near the front end of the base 6

Usually, the pins 22, 25 serving as fulcrums are located close to an imaginary line that extends through the front and rear edges of the saw blade 4. With this configuration, a position from which the tilting saw blade 4 projects downward beyond the bottom surface 6a of the base 6 does not significantly differ from a position from which the upright saw blade 4 projects downward. Also, a large cutting depth can be secured when the cutting operation is performed with the tilting saw blade 4 (slant cut).

(3) Saw Blade Cutting Depth Regulating Mechanism

Figure 10:
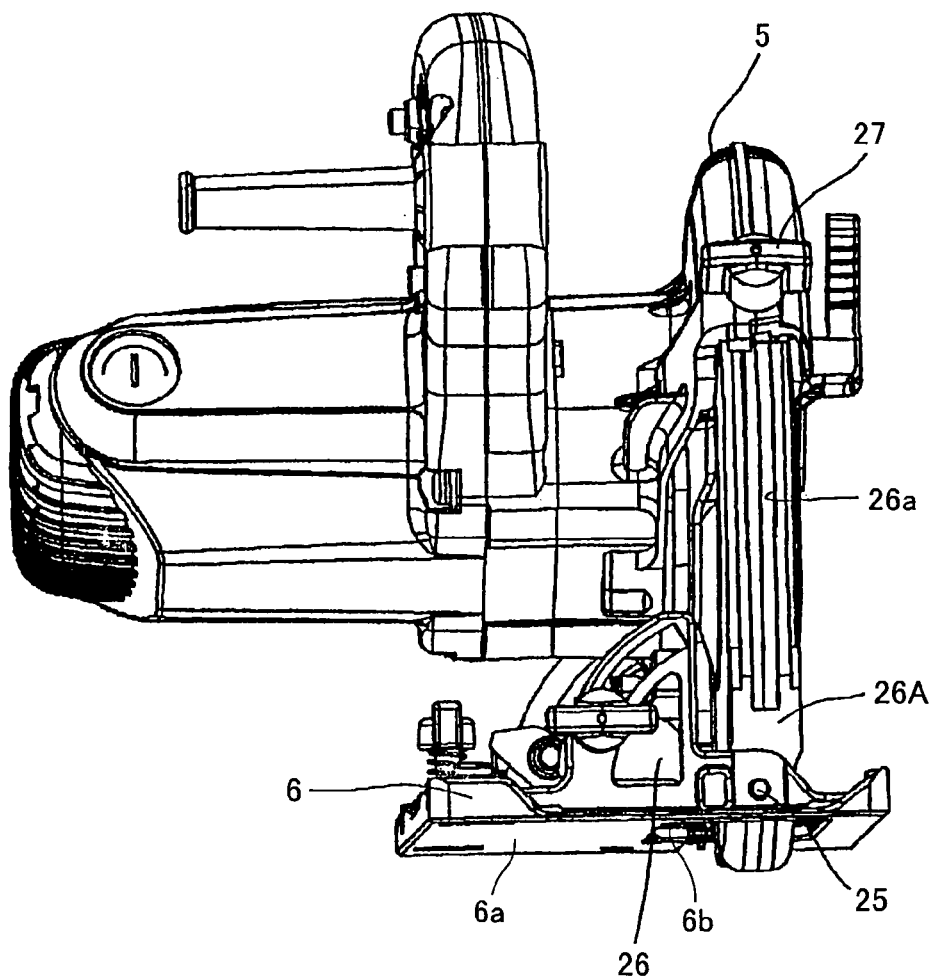
FIG. 10 is a schematic left-side view of the portable electric circular saw according to the first embodiment with a shallow cutting depth.
Figure 11:
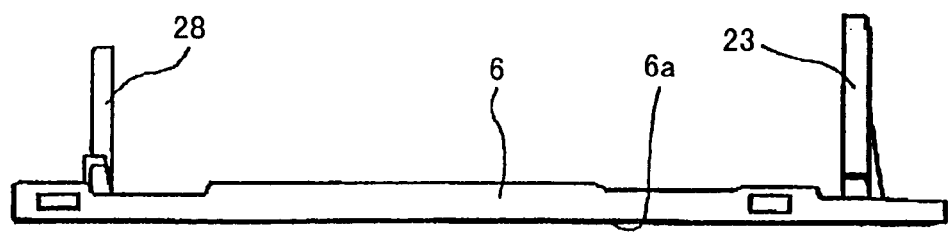
FIG. 11 is a schematic front view of the base of the portable electric circular saw according to the first embodiment.

As described above, the saw cover 5 can pivot about the rotary shaft 20, upward and downward relative to the hinge holding section 21. The link 26 is linked to the pin 25 at a lower part thereof. As shown in FIG. 10, the upper part of the link 26 can be housed inside the saw blade housing section 5a and is provided with a link guide 26A having a shape corresponding to the upper inner wall of the saw blade housing section 5a. The link guide 26A is formed with a longitudinally-extending long hole 26a at the upper section. A cutting depth regulating bolt 27 is fitted to the saw cover 5 through the long hole 26a. Tightening the bolt 27 fixes the position of the link guide 26A relative to the saw cover 5.

Figure 9:
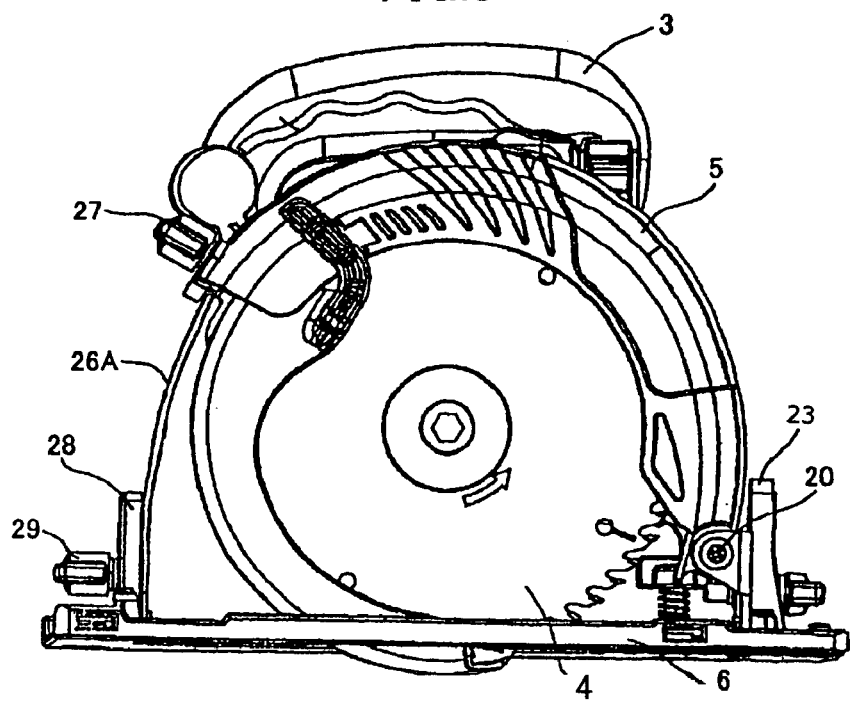
FIG. 9 is a schematic front view of the portable electric circular saw according to the first embodiment with a shallow cutting depth.

With this configuration, the saw cover 5 can pivot relative to the base 6 about the rotary shaft 20. Pivoting movement of the saw cover 5 changes the amount of the saw blade 4 projecting beyond the bottom surface 6a of the base 6, i.e., the cutting depth. The cutting depth can be fixed by tightening the bolt 27. FIGS. 9 and 10 indicate the saw cover 5 pivoted clockwise about the rotary shaft 20 so that the link guide 26A exposes from the rear end of the saw cover 5.

(4) Laser Unit

Figure 5:
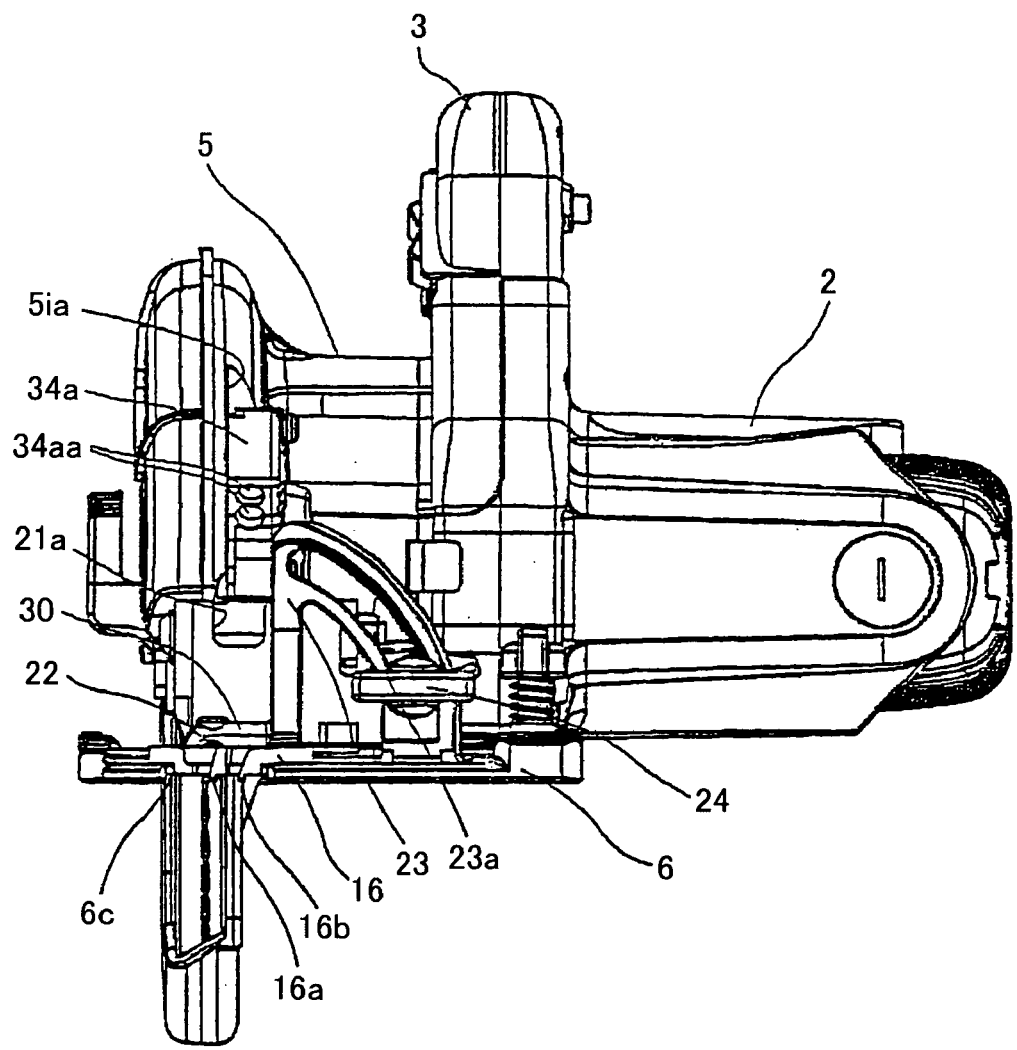
FIG. 5 is a schematic right-side view of the portable electric circular saw according to the first embodiment of the present invention.
Figure 16:
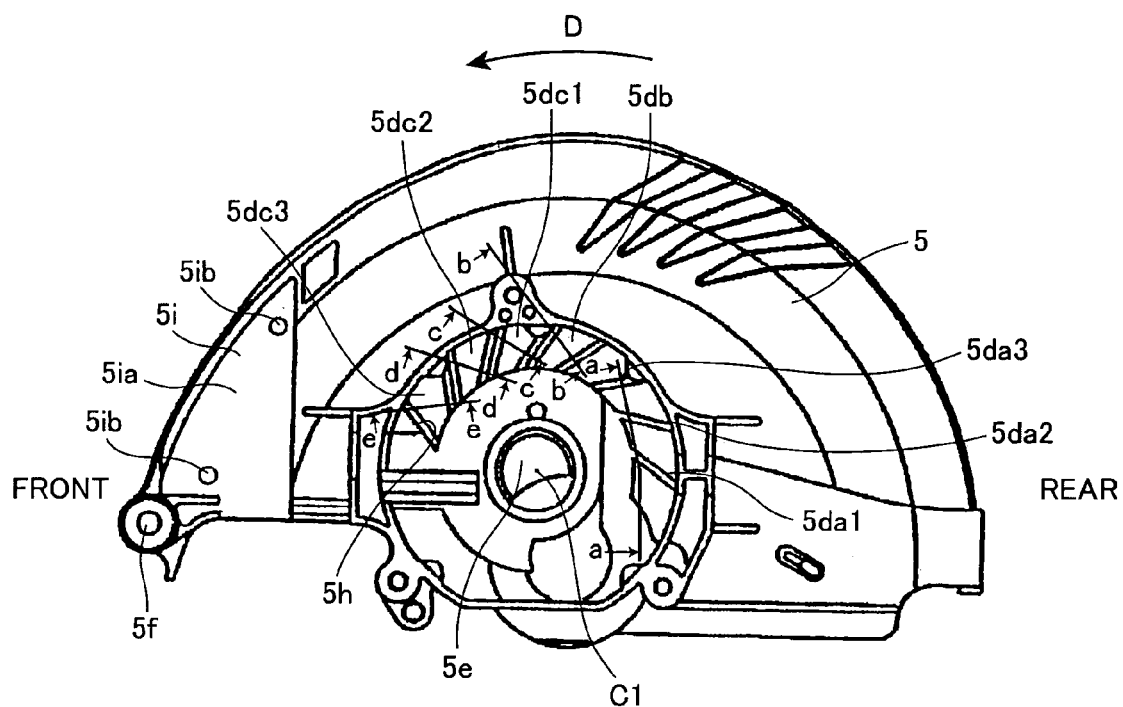
FIG. 16 is a schematic rear view of the saw cover of FIG. 15.
Figure 17:
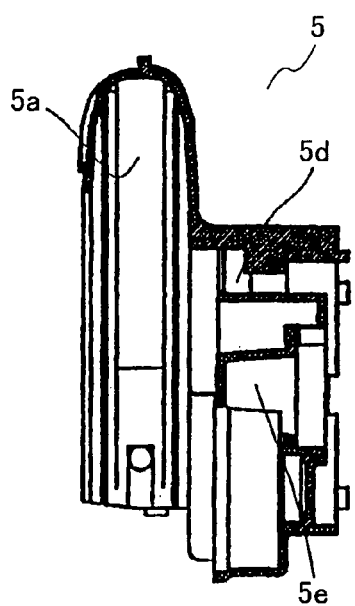
FIG. 17 is a cross-sectional view of the saw cover taken along a line B—B in FIG. 15.
Figure 18:
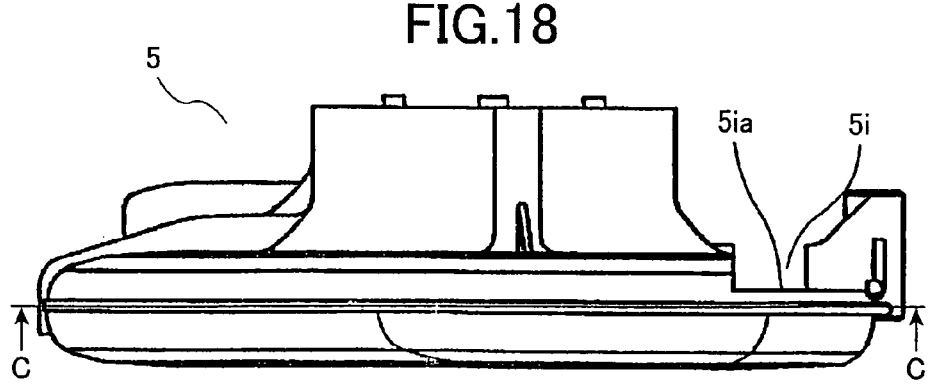
FIG. 18 is a schematic front view of the saw cover of FIG. 16.
Figure 25:
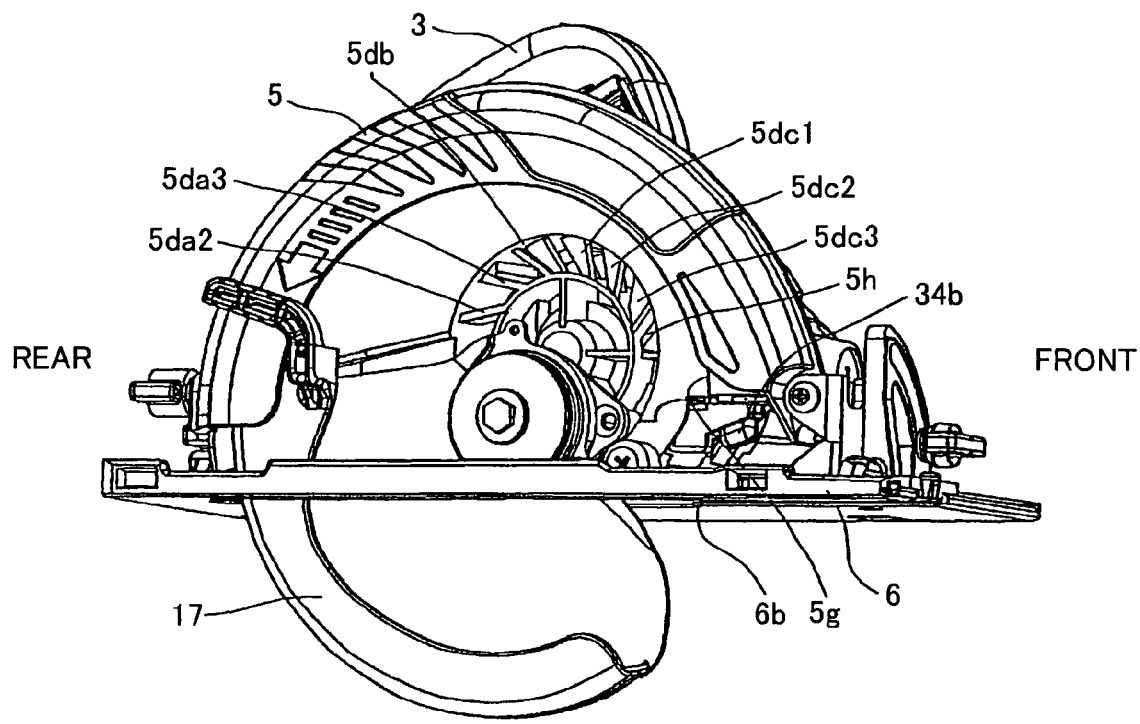
FIG. 25 is a schematic perspective view of the portable electric circular saw according to the first embodiment with the saw blade removed.
Figure 28:
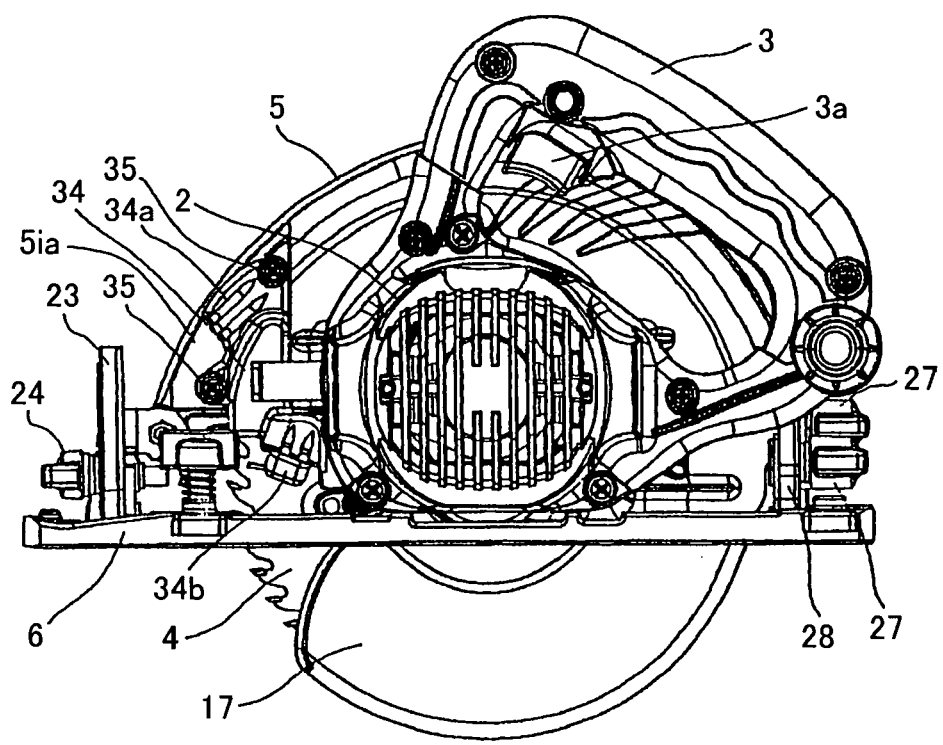
FIG. 28 is a schematic rear view of the portable electric circular saw according to the first embodiment.

The saw blade housing section 5a of the saw cover 5 has a housing-side outer wall that faces the housing 4. As shown in FIGS. 4–6, a laser unit 34 is disposed on the housing-side outer wall of the saw blade housing section 5a. The laser unit 34 includes light irradiation devices 34a, 34b. As shown in FIG. 18, the housing-side outer wall of the saw blade housing section 5a is formed with a recess 5i having a plane section 5ia extending substantially in parallel with the lateral surfaces of the saw blade 4. As shown in FIG. 16, the plane section 5ia is formed with a pair of threaded holes 5ib. The laser unit 34 is attached to the plane section 5ia by a screw 35 (FIG. 28) such that the surface of the light irradiation device 34a contacts the surface of the plane section 5ia. The light irradiation device 34a includes two LEDs 34aa that emit laser beams to illuminate the edge position of the saw blade 4 at the front end of the base 6 and at a spot ahead of the front end as viewed in the cutting direction. The light irradiation device 34b projects from the lower front end of the saw cover 5 toward the base 6 (FIGS. 25, 28). The light irradiation device 34b includes LEDs (not shown) that emit laser beams in a direction inclined with respect to the lateral surfaces of the saw blade 4. The ON/OFF control of the laser unit 34 is performed by a user operating on switches 3b provided to the handle 3. The laser unit 34 is supplied with power from a power source of the portable electric circular saw.

Positional accuracy is required when arranging the laser unit 34, the light irradiation device 34a in particular. According to the present embodiment, the light irradiation device 34a can easily and accurately be positioned due to the external profile of the plane section 5ia of the saw cover 5 and that of the laser unit 34. Hence, the assembling operation can be conducted highly efficiently. Note that, as shown in FIGS. 5 and 6, the hinge holding section 21 that is located on an irradiation path of the laser light from the LED 34aa is formed with a recess 21a so as not to block the laser beams.

(5) Base

Next, the base 6 will be described in detail with reference to FIGS. 11–14.

Figure 12:
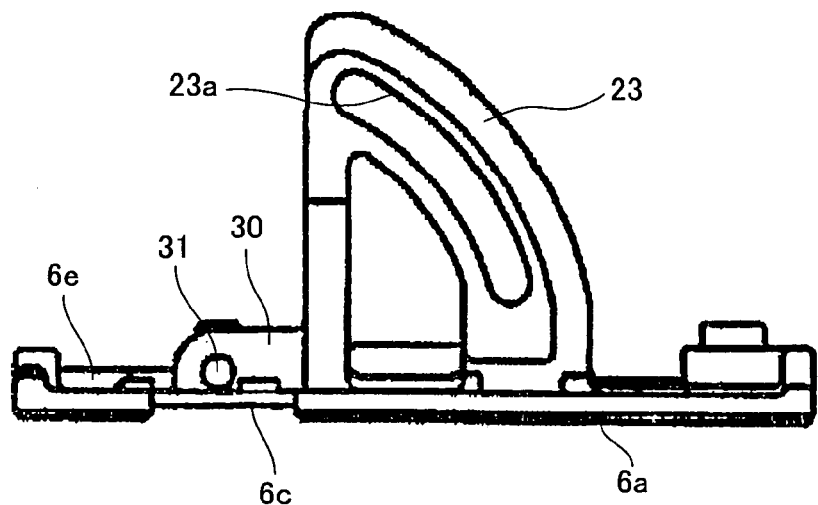
FIG. 12 is a schematic right-side view of the base of FIG. 11.
Figure 13:
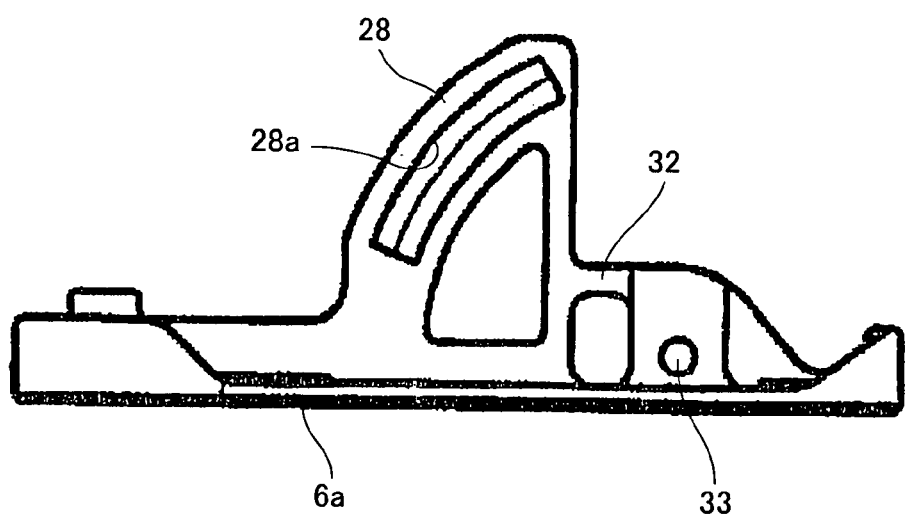
FIG. 13 is a schematic left-side view of the base of FIG. 11.

The above-described bevel plates 23, 28 are arranged near the front and rear ends of the base 6, respectively. Each bevel plate 23, 28 extends along the corresponding one of the front and rear edges of the base 6. The bevel plate 23, 28 is arranged in an upright posture so as to extend in a direction perpendicular to the bottom surface 6a of the base 6. Projecting parts 30, 32 are formed integrally with the bevel plates 23, 28, respectively, to project from the base 6 and support the corresponding ones of the pins 22, 25 that serve as linking sections for linking the base 6 and the saw cover 5. More specifically, as shown in FIG. 12, the projecting part 30 is formed with a hole 31 in which the pin 22 is supported. On the other hand, the projecting part 32 is formed with a hole 33 in which the pin 25 is supported. The central axes of the holes 31, 33 are aligned with each other in a direction substantially parallel to the surfaces of the saw blade 4.

Alternatively, it is possible to use a pair of projecting parts 30 each formed with the hole 31. The projecting parts 30 are arranged side by side in the axial direction of the pin 22. The pin 22 is supported between the projecting parts 30, and the hinge holding section 21 is disposed between the projecting parts 30. This configuration prevents deformation of the pin 22 that is linked to the hinge holding section 21. Accordingly, even if the user applies excess pressure to the saw cover 5 via the handle 3 during cutting operations, change in cutting depth and the angle of the saw blade 4 can be suppressed.

Figure 14:
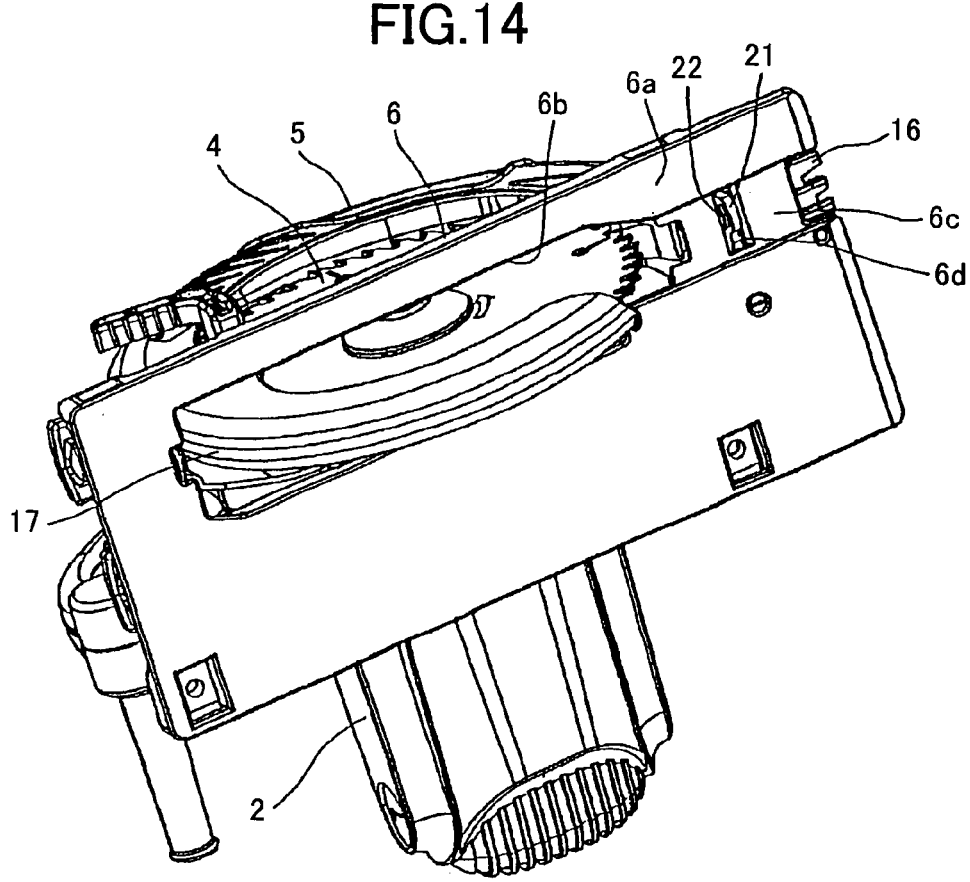
FIG. 14 is a schematic perspective view of the bottom surface of the portable electric circular saw according to the first embodiment.

As shown in FIG. 14, the bottom surface 6a of the base 6 is formed with a groove 6c at a front position as viewed in the cutting direction. The groove 6c is in fluid communication with the opening 6b and extends to the front end of the base 6. In the state shown in FIG. 9, the groove 6c is located on an imaginary line that extends forward in the cutting direction from the front edge of the saw blade 4 in the upright posture and has a width greater than the thickness of the blade edge of the saw blade 4. The width of the groove 6c is sufficiently large so that even an imaginary line that extends in the cutting direction from an intersection between the saw blade 4 tilting by the maximum angle of 45 degree and the bottom surface 6a of the base 6 is found within the groove 6c (see FIG. 6). As shown in FIG. 12, the depth of the groove 6c is less than a half of the thickness of the base 6.

As shown in FIGS. 1, 4 and 5, the guide piece 16 for indicating the edge position of the saw blade 4 is detachably attached to the top surface of the base 6 by a screw 18, at a position corresponding to the front part of the groove 6c. The guide piece 16 includes a guide section 16a and a guide section 16b. The guide section 16a indicates the edge position of the saw blade 4 in the upright posture where the surfaces of the saw blade 4 extend perpendicular to the bottom surface 6*a* of the base 6. The guide section 16*b* indicates the edge position of the saw blade 4 that is tilted by 45 degree with respect to the bottom surface 6*a* of the base 6.

The bottom surfaces of the guide sections 16*a*, 16*b* project downward to be flush with the bottom surface 6*a* of the base 6, whereas the bottom surface of the guide piece 16 except the guide sections 16*a*, 16*b* is substantially flush with the top surface of the groove 6*c*. With this arrangement, the guide section 16*a* or 16*b* can be easily aligned with the marking line drawn on the cutting object. Also, because the bottom surface of the guide piece 16 except the guide sections 16*a*, 16*b* is substantially flush with the top surface of the groove 6*c*, an air pathway is defined between the bottom surface of the guide piece 16 and the upper surface of the cutting object for allowing air to pass therethrough. Note that as long as the air pathway is established between the bottom surface of the guide piece 16 and the cutting object, it is unnecessary to make the bottom surface of the guide piece 16 to be flush with the top surface of the groove 6*c*.

As described above, the groove 6*c* is formed on the imaginary line extended forward in the cutting direction from the front edge of the saw blade 4. Therefore, even when the bottom surface 6*a* of the base 6 slide on the upper surface of a cutting object during cutting operation, the bottom surface 6*a* does not contact the marking line drawn on the upper surface of the cutting object. Accordingly, there is no danger that the marking line is blurred or erased, enabling accurate cutting operation. Also, because the bottom surface 6*a* does not contact the marking line, the ink of the marking line will not transfer to the bottom surface 6*a*, ensuring the cutting object stay clean.

As described above, the groove 6*c* is formed on the imaginary line extended in the cutting direction from the front edge of the saw blade 4, and the pin 22 is arranged near the imaginary line. In other words, the pin 22 locates vertically above the groove 6*c* on the base 6 (FIG. 12). The projecting part 30 formed with the hole 31 for holding the pin 22 on the base 6 extends from where the groove 6*c* is formed and to where the groove 6*c* is not formed (near the left edge of the bevel plate 23). With this configuration, even when a user applies excessive pressure onto the saw cover 5 via the handle 3 during cutting operations, the projecting part 30 prevents the base 6 from being deformed, particularly in an area near the groove 6*c*. Also, a reinforcement rib 6*e* is provided on the base 6 to extend from where the groove 6*c* is formed to where the groove 6*c* is not formed and to protrude upward from the base 6 and continues from the projecting part 30. This reinforcement rib 6*e* strengthens the base 6 whose strength has been reduced in an area around the groove 6*c* due to the presence of the groove 6*c*. The reinforcement rib 6*e* may be formed either continuously with or independent from the projecting part 30.

As shown in FIG. 14, the base 6 is formed further with a hole 6*d* in fluid communication with the groove 6*c*. This hole 6*d* is formed during the machining operation for raising the planar accuracy of the saw-blade-side surface of the projecting part 30. Since the pin 22 locates near the top surface of the base 6, a lower part of the hinge holding section 21 projects downward beyond the top surface of the base 6 through the hole 6*d*. In other words, the hole 6*d* serves as a housing that houses the lower part of the hinge holding section 21.

(6) Blower Mechanism

Next, a blower mechanism that utilizes fanned air produced by the fan 7 will be described with reference to FIGS. 3 and 15–28. As shown in FIG. 3, the gear casing part of the saw cover 5 has a width equal to or greater than the width of the gear 9 in the axial direction of the output shaft 1*a*. As shown in FIG. 15, the gear casing part is formed with the fanned air discharge ports 5*c* at a position radially outward from the pinion gear 8. The fanned air discharge ports 5*c* leads the fanned air, that has flown through the housing 2 and cooled the motor 1, from the housing 2 into the saw blade housing section 5*a*.

The fanned air discharge ports 5*c* are defined by a plurality of division walls 5*d* arranged in the saw cover 5. The division walls 5*d* may be formed either integrally with or separate from the saw cover 5. As shown in FIG. 3, each division wall 5*d* has the width L1 that is about ⅓ of the width L of the gear casing part of the saw cover 5 in the axial direction of the output shaft 1*a*. The fanned air discharge ports 5*c* have a radial dimension that allows the outer peripheries of the vanes of the fan 7 to be located within the fanned air discharge ports 5*c* with respect to the radial direction of the output shaft 1*a*.

Figure 19:
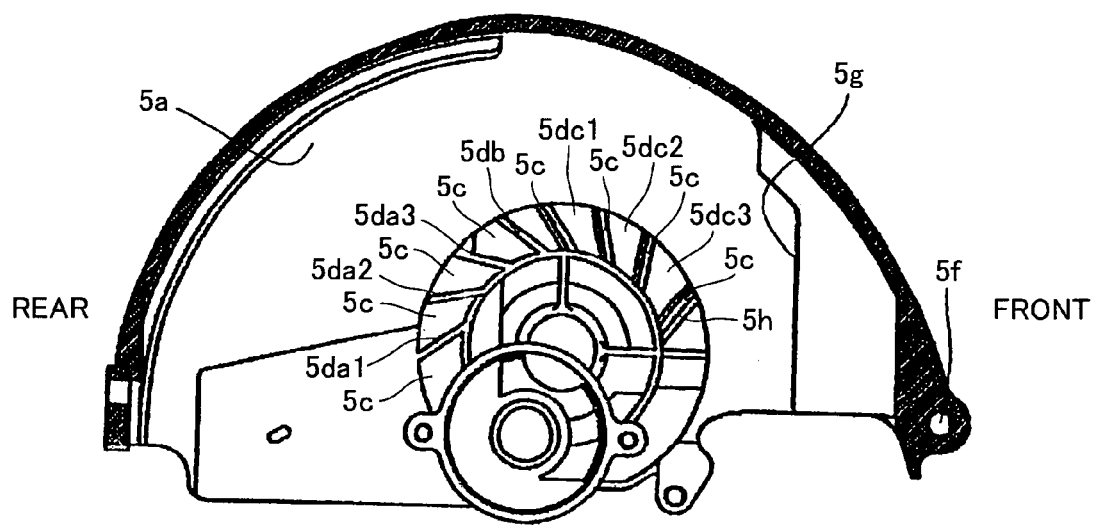
FIG. 19 is a schematic cross-sectional view of the saw cover taken along line a C—C in FIG. 18.

In this embodiment, a total of seven division walls 5*d* are provided. As shown in FIGS. 15 and 16, the fanned air discharge ports 5*c* are arranged radially about the rotation center C1 of the fan 7. More specifically, the division walls 5*d* include division walls 5*da*1, 5*da*2, 5*da*3, 5*db*, 5*dc*1, 5*dc*2, and 5*dc*3 arranged in this order from the upstream side in the rotation direction D of the fan 7. A single fanned air discharge port 5*c* is defined between two adjacent division walls 5*d*. Since the division walls 5*da*1, 5*da*2, and the like extend substantially in parallel with the rotation axis of the fan 7, only the end surfaces of these division walls are shown in FIGS. 15 and 19, and the fanned air discharge ports 5*c* are shown as the gaps between the division walls. On the other hand, because the division walls 5*db*, 5*dc*1, and the like each has a part (guide portion to be described later) that is not in parallel with the rotation axis of the fan 7, not only the end surfaces but also the guide portions of these division walls are shown in FIGS. 15 and 19. Therefore, the guide portions and also the fanned air discharge ports 5*c* are shown between the adjacent division walls in these drawings.

Figure 20:
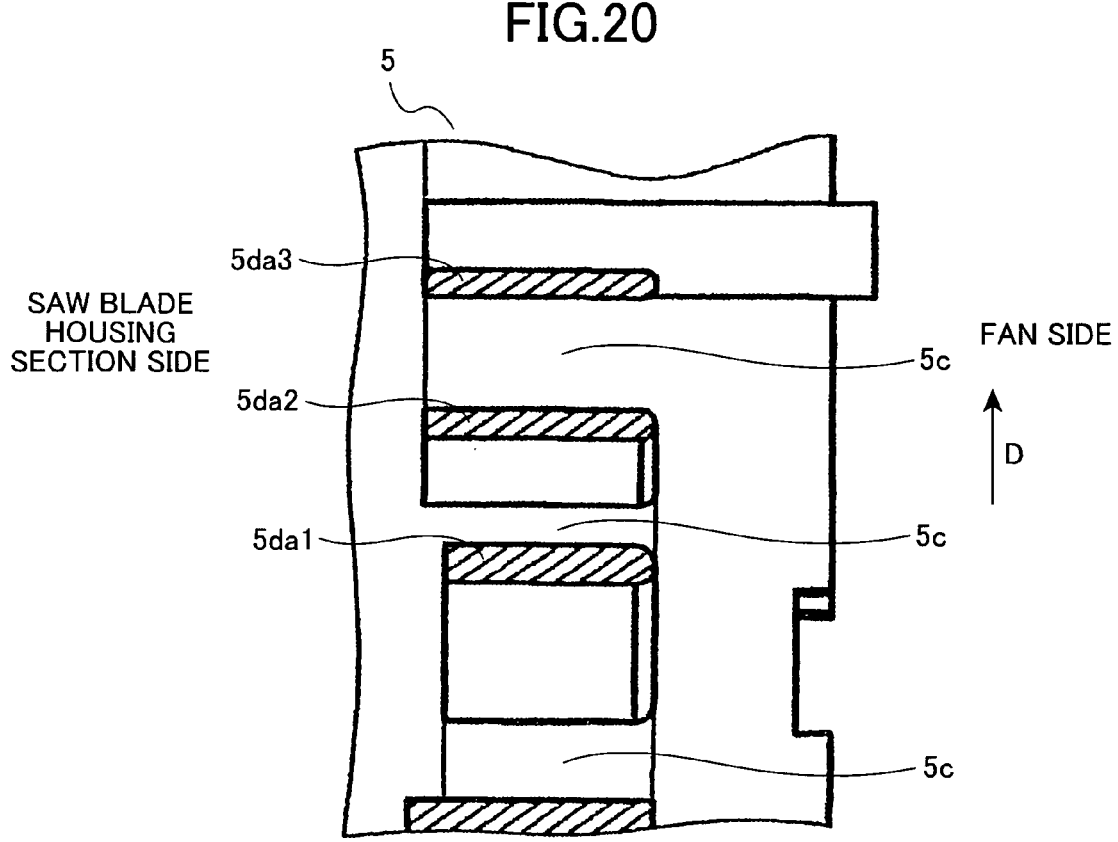
FIG. 20 is a schematic cross-sectional view of division walls of the saw cover taken along a line a—a in FIG. 16.

The division walls 5*d* are divided into three different groups. The first group includes the division walls 5*da*1, 5*da*2, and 5*da*3 located at the upstream side in the rotation direction D of the fan 7 and rear of both the rotation center C1 of the fan 7 and the rotation center C2 of the saw blade 4 in the cutting direction. As shown in FIG. 20, these division walls 5*da*1–5*da*3 extend substantially in parallel with in the rotary shaft of the fan 7 for discharging fanned air in the direction substantially parallel to the rotary shaft of the fan 7.

Figure 22:
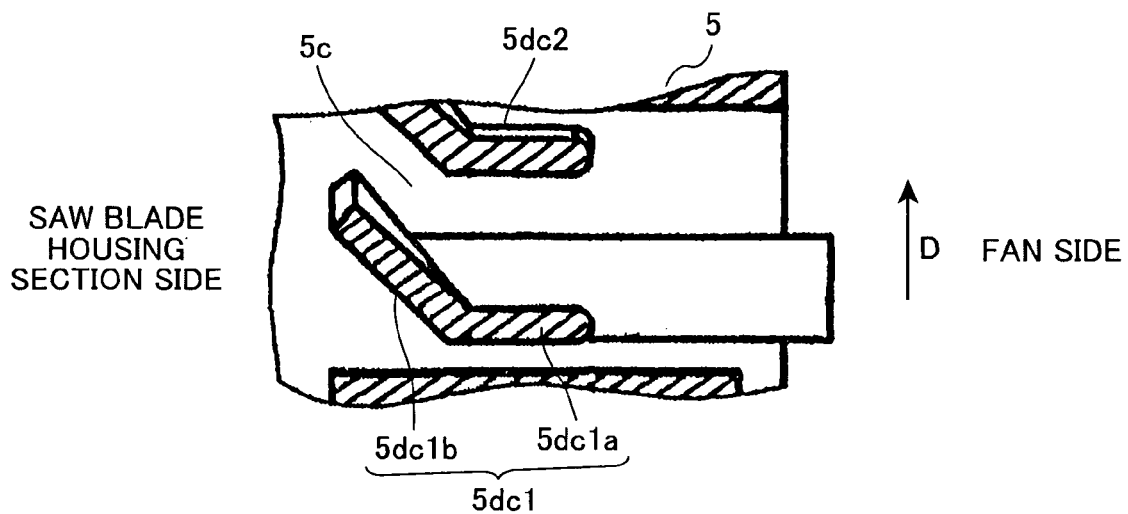
FIG. 22 is a schematic cross-sectional view of a division wall of the saw cover taken along a line c—c in FIG. 16.
Figure 23:
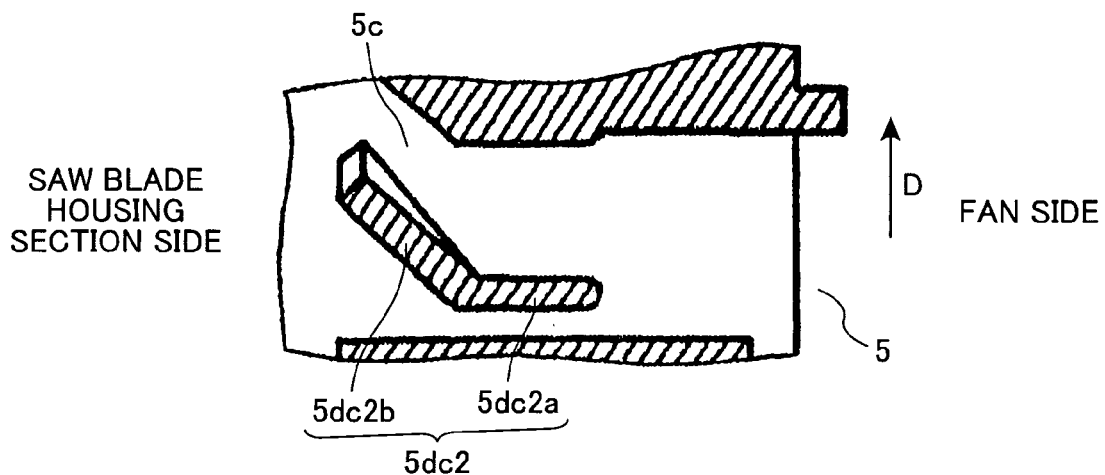
FIG. 23 is a schematic cross-sectional view of a division wall of the saw cover taken along a line d—d in FIG. 16.
Figure 24:
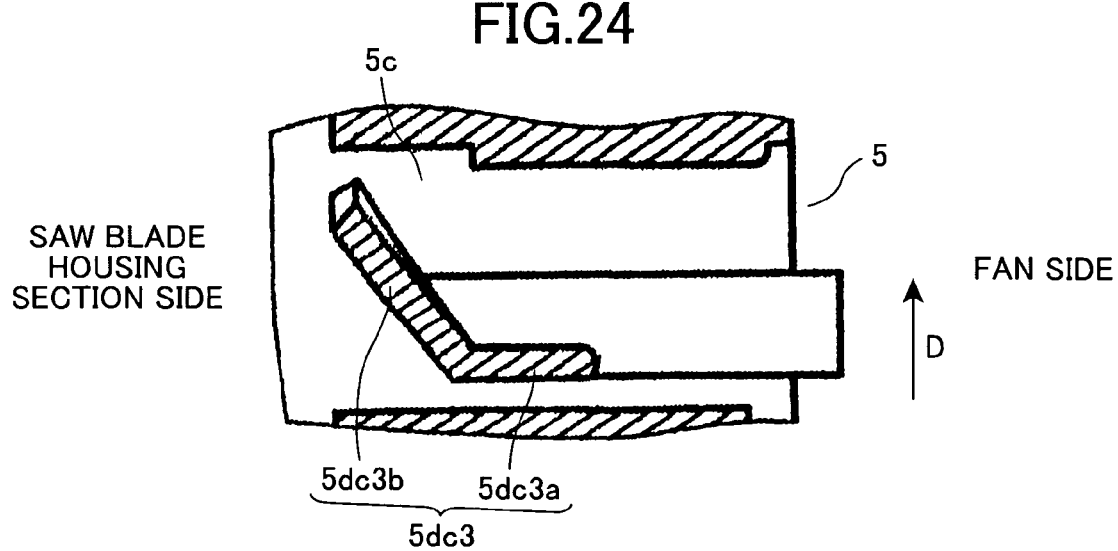
FIG. 24 is a schematic cross sectional view of a division wall of the saw cover taken along a line e—e in FIG. 16.

The second group of the division walls 5 includes the division walls 5*dc*1, 5*dc*2, and 5*dc*3 located downstream side in the rotation direction D of the fan 7. The division walls 5*dc*1–5*dc*3 are located in front of the rotation center of C1 of the fan 7 and the rotation center C2 of the saw blade 4 with respect to the cutting direction. As shown in FIGS. 22–24, the division walls 5*dc*1–5*dc*3 include flow rate reducing parts 5*dc*1*a*, 5*dc*2*a*, 5*dc*3*a* extending in the direction substantially parallel to the rotation axis of the fan 7 and guiding parts 5*dc*1*b*, 5*dc*2*b*, 5*dc*3*b* extending aslant from the flow rate reducing parts 5*dc*1*a*–5*dc*3*a*. The flow rate reducing parts 5*dc*1*a*–5*dc*3*a* are arranged at the fan side, whereas the guiding parts 5*dc*1*b*–5*dc*3*b* are arranged at the sawblade-housing-section side. The division walls 5dc1–5dc3 discharges fanned air forward in the cutting direction.

Figure 21:
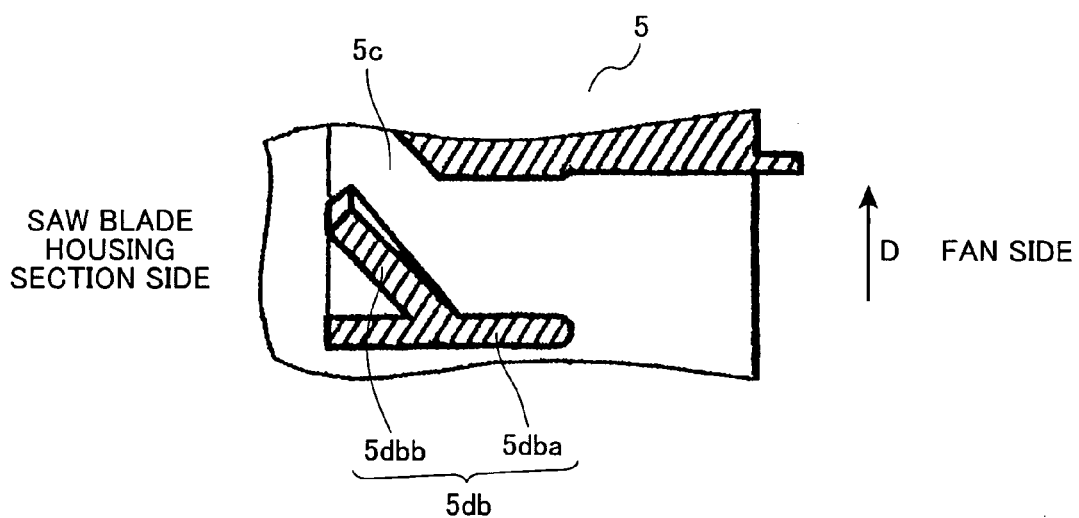
FIG. 21 is a schematic cross-sectional view of a division wall of the saw cover taken along a line b—b in FIG. 16.

The third group includes the division wall 5db that is located between the first group (division walls 5da1–5da3) and the second group (division walls 5dc1–5dc3) in the rotation direction D of the fan 7. The division wall 5db is disposed substantially vertically above the rotation center C2 of the saw blade 4. As shown in FIG. 21, the division wall 5db includes a flow rate reducing part 5dba extending substantially in parallel with the rotary axis of the fan 7 and a guiding part 5dbb extending aslant from the flow rate reducing part 5dba. The flow rate reducing part 5dba has a length substantially the same as that of the division walls 5dc1–5dc3 in the direction parallel to the rotary axis of the fan 7.

The guiding parts 5dbb, 5dc1b, 5dc2b, and 5dc3b of the division walls 5d each has an upstream-side wall surface that faces upstream side with respect to the rotation direction D of the fan 7. The upstream-side wall surface extends aslant from a housing-side end of the corresponding flow rate reducing part 5dba, 5dc1a, 5dc2a, 5dc3a, toward the downstream in the rotation direction D. The housing-side end is the end close to the saw blade housing section 5. The angle of the upstream-side wall surfaces of the guiding parts 5dbb and 5dc1b–5dc3b with respect to the upstream-side wall surfaces of the corresponding flow rate reducing part 5dba and 5dc1a–5dc3a is 45 degree. In the division wall 5dc1–5dc3, the boundary between the upstream-side wall surface of the flow rate reducing part 5dc1a–5dc3a and the upstream-side wall surface of the reducing part 5dc1b–5dc3b is not chamfered to show an arc-shaped profile, but is left in angular shape.

As shown in FIGS. 15 and 16, the division walls 5da1–5da3, the flow rate reducing part 5dba of the division wall 5db, and the flow rate reducing parts 5dc1a–5dc3a of the division walls 5dc1–5dc3 are arranged to incline 45 degree (angle è shown in FIG. 15) with respect to the radial directions of the rotary axis of the fan 7 (rotation center C1) such that the radially outer ends of the division walls 5da1–5da3 and the flow rate reducing parts 5dba and 5dc1a–5dc3a are located upstream from the radially inner ends thereof with respect to the rotation direction D of the fan 7.

A wall 5h is disposed at the downstream side of the division wall 5dc3 in the rotation direction D, defining a fanned air discharge port 5c therebetween. Similar to the division wall 5da1 and the like, an upstream-side wall surface of the wall 5h is inclined from the radial direction of the rotary axis of the fan 7 so that the radially outer end of the wall 5h locates downstream from the radially inner end of the wall 5h with respect to the rotation direction D. The housing-section-side edge surface of the guiding part 5dc3b of the division wall 5dc3 extends substantially in parallel with the wall surface of the wall 5h.

Figure 26:
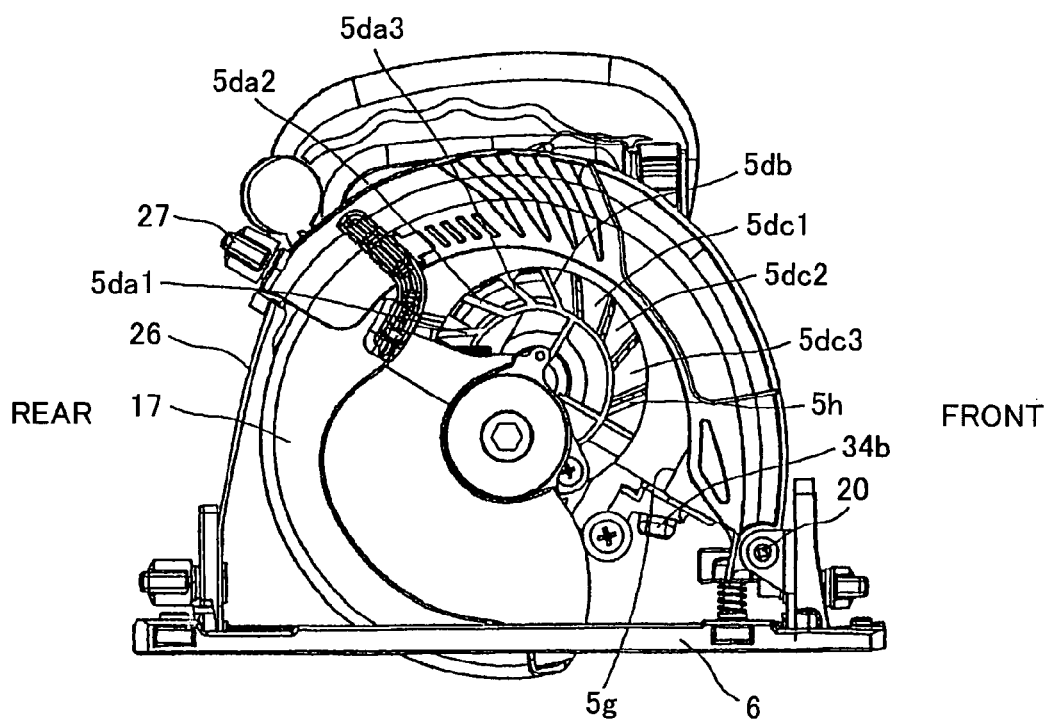
FIG. 26 is a schematic front view of the portable electric circular saw according to the first embodiment with the saw blade removed and the saw cover pivoted relative to the base.

As shown in FIGS. 15 and 26, the division walls 5d are formed such that a user can see the other side of the division walls 5d through the discharge ports 5c when viewed from the front side of the saw cover 5, i.e, from the saw blade housing section 5a side or from the left side in FIG. 3. More specifically, the division wall 5db and the division wall 5dc1 define, therebetween, a gap that extend in the direction parallel to the rotary axis of the fan 7. In other words, the division wall 5db does not overlap with the division wall 5dc1 with respect to the direction parallel to the rotary axis of the fan 7. The division wall 5dc2 and its adjacent division wall 5dc3 show the similar relationship, and so do the other division walls 5d. With this arrangement, the saw cover 5 can be formed by molding. The surfaces defining these gaps between adjacent division walls 5d are in substantially parallel with each other with respect to the radial direction of the rotary axis of the fan 7.

When the saw cover 5 is viewed from the front side thereof (left side in FIG. 3), the housing-section-side end surface of each of the guiding parts 5dbb, 5dc1b, 5dc2b of the division walls 5db, 5dc1, 5dc2 is in substantially parallel with the housing-section-side end surface of corresponding one of the flow rate reducing parts 5dc1a, 5dc1a, and 5dc3a of the adjacent division walls 5dc1, 5dc2, and 5dc3. Therefore, for example, the angle between the guiding part 5dbb and the flow rate reducing part 5dba at a radially inner area differs from the angle at a radially outer area. The same is true for the guiding part 5dc1b and the flow rate reducing part 5dc1a, the guiding part 5dc2b and the flow rate reducing part 5dc2a, and the guiding part 5dc3b and the flow rate reducing part 5dc3a. With this arrangement, the spaces between the adjacent division walls 5d can be utilized effectively to define the fanned air discharge paths 5c through which fanned air is discharged forward in the cutting direction. Here, each guiding part 5dbb, 5dc1b, 5dc2b has a continuous surface.

As shown in FIGS. 19 and 25–27, a step 5g projecting toward the saw blade 4 is formed on the inner wall of the saw blade housing section 5a at a position between the fanned air discharge ports 5c and the lower front end of the saw cover 5 with respect to the cutting direction. The step 5g is the rear side of the above-described recess 5i. That is, the step 5g is formed when the recess 5i is formed. The step 5g is formed such that the lower end of the step 5g locates rear of the front end of the opening 6b of the base 6 in the cutting direction even when the saw blade 4 is pivoted forward as shown in FIG. 26 to reduce the cutting depth.

Figure 27:
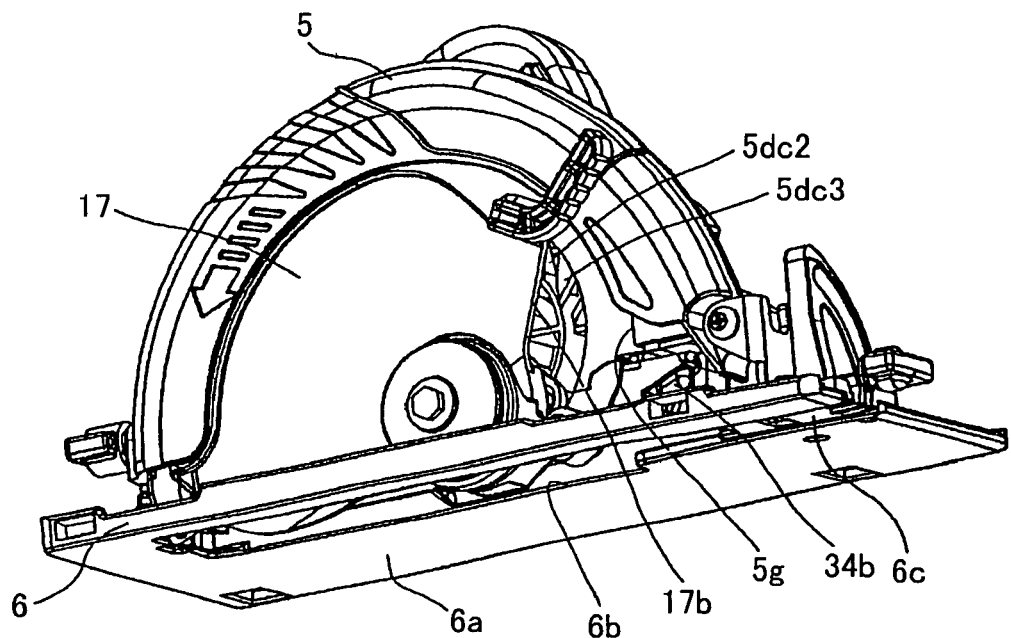
FIG. 27 is a schematic perspective view of the portable electric circular saw according to the first embodiment with the saw blade removed and a safety cover pivoted to a position where the lower end of the safety cover does not project beyond the bottom surface of the base.

As shown in FIG. 27, the front end of the safety cover 17 in the pivoting direction (clockwise direction in FIG. 27) can come into abutment with the step 5g in the saw blade housing section 5a. In this manner, the step 5g prevents the safety cover 17 from being pivoted in the pivoting direction by more than a predetermined amount.

In FIG. 3, the fan 7 is a centrifugal fan, and hence fanned air is blown out in radial directions of the fan 7. A fan guide 19 in the housing 2 makes the fanned air flow along the inner wall of the housing 2, and the fanned air flows into the fanned air discharge ports 5c while whirling. After entering the fanned air discharge ports 5c, the fanned air is decelerated by striking the upstream-side wall surfaces of the division walls 5da1–5da3, the upstream-side wall surface of the flow rate reducing part 5dba of the division wall 5db, and the upstream-side wall surfaces of the flow rate reducing parts 5dc1a–5dc3a of the division walls 5dc1–5dc3. Then, the fanned air flows along the wall surfaces through the fanned air discharge ports 5c and is discharged into the saw blade housing section 5a. Especially, the fanned air struck the flow rate reducing parts 5dc1a–5dc3a is discharged into the saw blade housing section 5a after flowing along the wall surfaces of the guide parts 5dc1b–5dc3b that are in continuous with the flow rate reducing parts 5dc1a–5dc3a. At this time, because the division walls 5da1–5da3 and the flow rate reducing parts 5dba and 5dc1a–5dc3a are inclined with respect to the radial directions of the rotary shaft of the fan 7, the fanned air is discharged into the saw blade housing section 5a while whirling around the rotation center C1 of the fan 7 in the rotation direction D and being directed radially inward. Because the fanned air whirls radially and inwardly in this manner, the flow rate and the amount of the fanned air being discharged from the fanned air discharge ports 5c into the saw blade housing section 5a is smaller in a radially outer area and larger in a radially inner area. Therefore, noise generated in the radially outer area of each fanned air discharge port 5c is suppressed while securing a sufficient flow amount by raising the flow amount in the radially inner area, which in turn secures the flow amount into the opening 6b and thus into the groove 6c as will be described later.

It should be noted that these effects can be obtained only by arranging the division walls 5d to have upstream-side wall surfaces that tilt from the radial directions of the rotary shaft of the fan 7 and that extend in a direction opposite to the rotation direction D. However, in this embodiment, the downstream-side wall surfaces of the division walls 5d (particularly, the downstream-side wall surfaces of the flow rate reducing parts 5dc1a–5dc3a of the division walls 5dc1–5dc3, and the downstream-side wall surface of the flow rate reducing part 5dba of the division wall 5db) also tilt with respect to the radial direction to extend opposite to the rotation direction D as shown in FIGS. 20–24. Therefore, the upstream-side wall surfaces are substantially in parallel with the downstream-side wall surfaces. This arrangement secures the sufficient space for the air discharge ports 5c and, at the same time, enables to form the fanned air discharge ports 5c in a shape that inclines with respect to the rotary shaft of the fan 7. This in turn makes either to discharge the fanned air along the guiding parts into the saw blade housing section 5a and forward in the cutting direction.

Since the upstream-side wall surfaces of the guiding parts 5dbb and 5dc1b–5dc3b are tilted with respect to the rotary shaft of the fan 7 such that the housing-section side ends locate downstream from the fan-side ends with respect to the rotation direction D, the fanned air that has flown along the guiding parts 5dbb and 5dc1b–5dc3b is directed forward in the cutting direction and discharged into the saw blade housing section 5a. The discharged fanned air strikes the fan-side lateral surface of the safety cover 17 in the saw blade housing section 5a (FIG. 27) and the fan-side lateral surface of the saw blade 4 (FIG. 25) at an angle and flows along these lateral surfaces. Most of the fanned air flows along these lateral surfaces toward the rotary shaft 20 as viewed from the rotation center C1 (FIG. 15). Some of the fanned air that has flown along the lateral surfaces of the safety cover 17 and the saw blade 4 flows toward the opening 6b of the base 6.

As the cutting depth is increased, the section of the saw blade 4 that contacts the cutting object also increases with respect to the cutting direction. In this case, the saw blade 4 blocks more fanned air and prevents the same from flowing to the side of the saw blade 4 opposite from the housing 2 (the front side of the drawing sheet of FIG. 2 or left side in FIG. 3) through the space between the front edge of the saw blade 4 and the cutting object. Therefore, the fanned air is directed toward the opening 6b of the base 6 more effectively. Particularly, when the cutting depth is nearly the maximum as shown in FIG. 2, the fanned air is most likely to flow into the opening 6b of the base 6. Also, when the cutting depth is nearly the maximum and the safety cover 17 has been pivoted to be housed in the saw cover 5 as shown in FIG. 27, most of the fanned air discharged into the saw blade housing section 5a strikes the fan-side lateral surface of the safety cover 17, diffuses along the lateral surface, and flows frontward in the cutting direction. Some of the diffused air is discharged from the rear end of the saw cover 5 in the cutting direction after passing through between the saw blade housing section 5a and the safety cover 17. The air discharged from the rear end blows onto the rear part of the base 6, preventing accumulation of saw dust in this part.

As shown in FIG. 27, the safety cover 17 has a curving edge 17b defining a cutout part that prevents the safety cover 17 from covering the entire fanned air discharge ports 5c even when the safety cover 17 is held in contact with the step 5g as shown in FIG. 27. This allows the fanned air struck and flown along the lateral surface of the safety cover 17 and the fanned air directly discharged from the fanned air discharge ports 5c to flow smoothly toward the opening 6b of the base 6.

On the other hand, when the saw cover 5 is pivoted upward about the rotary shaft 20 as shown in FIG. 26 to decrease the cutting depth, some of the fanned air discharged from the fanned air discharge ports 5c flows along the lateral surface of the saw blade 4 into the opening 6b of the base 6, whereas the remaining fanned air strikes the step 5g. The fanned air struck the step 5g flows downward along the step 5g and then forward in the cutting direction to the opening 6b of the base 6.

The fanned air discharged into the opening 6b in this manner strikes the top surface of the cutting object and blows off the saw dust thereon, preventing saw dust from accumulating on and near the intersection of the edge of the saw blade 4 and the bottom surface 6a of the base 6 (cutting area) during the cutting operations. Therefore, the visibility of the cutting area and hence that of the marking line in the cutting area is enhanced to consequently improve the efficiency of the cutting operation.

The fanned air that has struck the top surface of the cutting object then flows along the top surface of the cutting object into the groove 6c. The width of the groove 6c with respect to the direction parallel to the rotary shaft of the saw blade 4 is smaller than the width of the opening 6b, and the groove 6c is formed such that a pair of imaginary lines extended in the cutting direction from the intersections of the lateral surfaces of the saw blade 4 and the bottom surface 6a of the base 6 locate within the groove 6c. Therefore, the fanned air flown into the groove 6c is directed in the cutting direction and discharged forward from the front end of the base 6. As a result, the discharged fanned air blows off and prevents saw dust from accumulating on the cutting object in front of the base 6. Particularly, because the groove 6c is located on the imaginary lines extended from the saw blade 4, the fanned air flows on the marking line drawn on the top surface of the cutting object, blowing off saw dust from the marking line and improving the efficiency of the cutting operation. Additionally, since the groove 6c has a sufficiently large width so that the groove 6c locates on the imaginary line extended from the saw blade 4 even when the saw blade 4 is tilted as described above, the inclined cutting operation also can be conducted efficiently.

Since the bottom surface of the guide piece 16 (FIG. 14) is substantially flush with the top surface of the groove 6c as described above, the fanned air that has flown into the groove 6c can be discharged from the front end of the base 6 without being blocked by the guide piece 16.

As described above, the boundaries of the upstream-side wall surfaces of the flow rate reducing parts 5dc1a–5dc3a and those of the guiding parts 5dc1b–5dc3b of the division walls 5dc1–5dc3 are not chamfered to show an arc-shaped profile, but are angular. If the boundaries are chamfered, the surface area of the flow rate reducing parts 5dc1a–5dc3a reduces so that fanned air will be discharged into the saw blade housing section 5a through the fanned air discharge ports 5c without sufficiently striking the flow rate reducing parts 5dc1a–5dc3a. In this case, the fanned air is not sufficiently decelerated, so that a large noise will be generated. However, in this embodiment, such a problem is overcome by leaving the boundaries angular.

Because the fanned air discharge ports 5c are defined by the plurality of division walls 5d, the strength of the saw cover 5 is secured while securing the sufficient area of the fanned air discharge ports 5c. Because all the division walls 5d are formed to incline with respect to the radial directions of the rotary shaft of the fan 7, the reinforcing effect of the division walls 5d reduces. However, the guiding parts 5dbb and 5dc1b–5dc3b, which are inclined relative to the rotary shaft of the fan 7 and formed integrally with some of the division walls 5d, enhances the reinforcing effect of the division walls 5d.

When the saw blade 4 is locked during the cutting operations, load is placed on the saw cover 5 via the bearings 11, 12, and 14, forcing the gear 9 and the pinion gear 8 to separate from each other. That is, the load is placed on the vicinity of the rotation center C1 of the fan 7 that is coaxial with the pinion gear 8 and also on the vicinity of the rotation center C2 of the saw blade 4 that is coaxial with the gear 9. However, according to the present embodiment, as shown in FIG. 25, the division walls 5dc1–5dc3 having the guiding parts 5dc1b–5dc3b are provided to these areas and improve the reinforcement effect particularly in these areas where relatively large load is placed, improving the service life of the saw cover 5.

Because the fanned air discharge ports 5c are arranged radially about the rotation center C1 of the fan 7, the fanned air discharged through any of the fanned air discharge ports 5c strikes the lateral surface of the saw blade 4 or the safety cover 17 and flows along the lateral surface into the opening 6b, regardless of the cutting depth. Therefore, the efficiency of the cutting operation is improved regardless of the cutting depth.

As described above, according to the present embodiment, the fanned air produced by the fan 7 cools the motor 1, flows through the groove 6c, and flows out from the front end of the base 1. The fanned air from the front end of the base 1 blows off dust from the top surface of the cutting object to prevent the dust from accumulating on the marking line on the cutting object. Thus, the marking line is prevented from being hid by dust and dirt that otherwise accumulate on the cutting object, and the cutting accuracy is improved. Because dust and dirt are blown off during the cutting operation, it is unnecessary to stop the cutting operation to remove the dust from the cutting object. In this manner also, the efficiency of the cutting operation is improved. Further, because the fanned air is discharged from the opening at the front end of the base 1 after passing through the groove 6c formed in the bottom surface 6a of the base 6, it is unnecessary to provide a separate guide pipe for guiding fanned air. Thus, the number of components is reduced to improve the efficiency of assembling and to reduce the cost. Also, such a guide pipe would not be obstacle to visually confirm the positional relationship between the marking line and the edge of the saw blade.

It should be noted that although the division walls 5dc1–5dc3 of the present embodiment have the flow rate reducing parts 5dc1a–5dc3a and the guiding parts 5dc1b–5dc3b, the division walls 5dc1–5dc3 could only have the guiding parts 5dc1b–5dc3b. With this configuration also, the fanned air can be discharged from the front end of the base 6 through the opening 6b and the groove 6c of the base 6.

It is possible to provide a member at the bottom surface 6a of the base 6 for covering the groove 6c as long as the fanned air discharged into the opening 6b can pass through the groove 6c and blow forward from the front end of the base 6.

In this embodiment, the saw cover 5 is linked to the base 6, and the housing 2 is linked to the base 6 via the saw cover 5. However, the present invention is not limited to this arrangement. For example, the housing 2 could be directly linked to the base 6, or the base 6 could be linked to a member that is not movable relative to the housing 2.

Next, a portable electric circular saw according to a second embodiment of the present invention will be described with reference to FIGS. 29–34. In this embodiment, the components that correspond to those of the first embodiment are denoted by the same reference symbols to which "100" is added. For example, a housing 102, a handle 103, a saw cover 105, a saw blade housing section 105a, fanned air discharge ports 105c, division walls 105d, a base 106, an opening 106b, a safety cover 117, and the like are shown in these drawings. While the fanned air flows forward in the cutting direction to the opening 6b through the saw cover 5 in the first embodiment, the fanned air flows forward to the opening 106b along the outer wall of the saw cover 105 in this second embodiment as described later.

Figure 29:
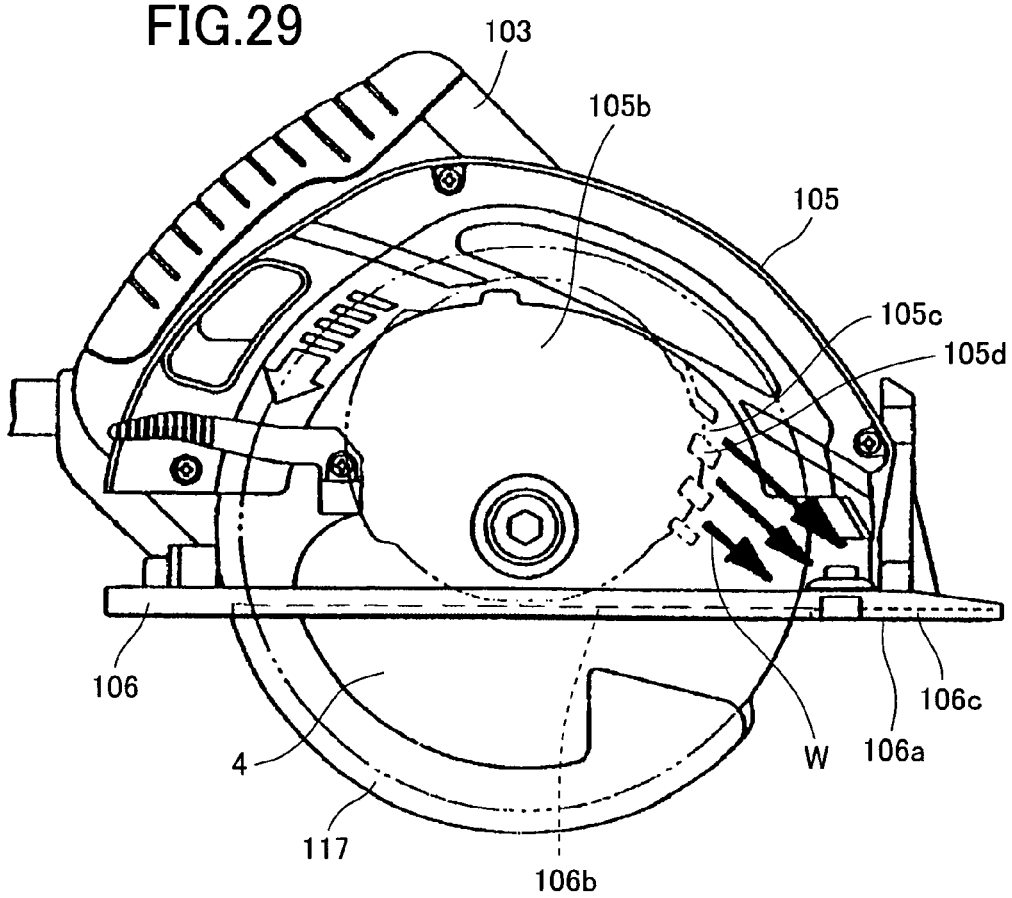
FIG. 29 is a schematic front view of a portable electric circular saw according to a second embodiment of the present invention.
Figure 30:
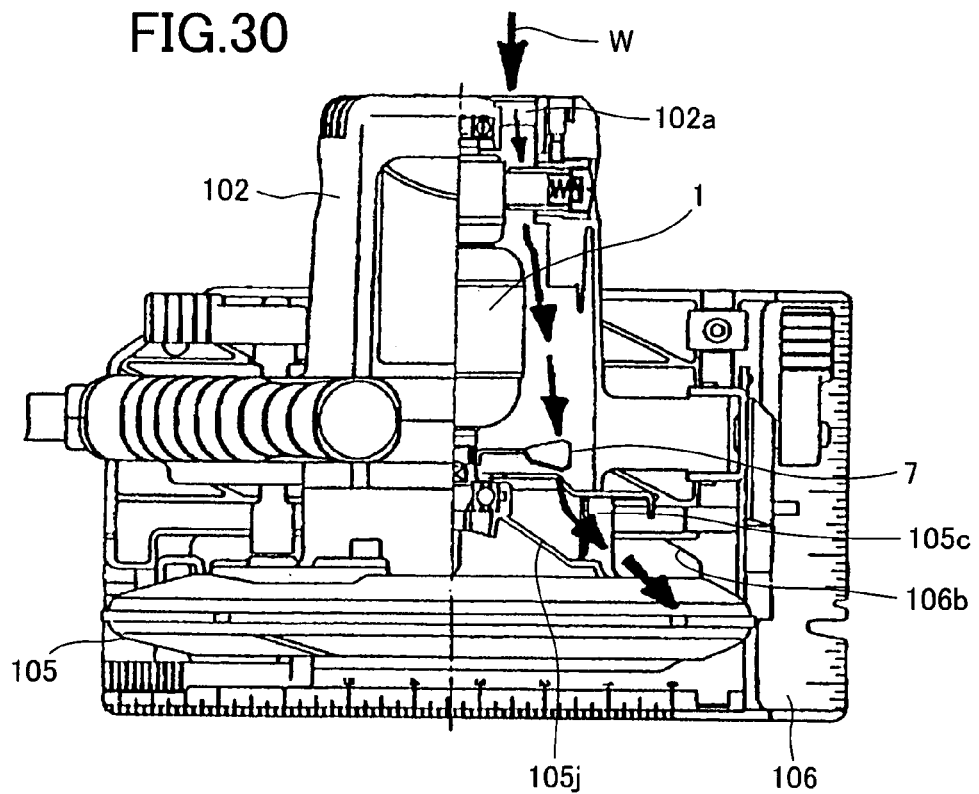
FIG. 30 is a schematic plan view of a principal part of the portable electric circular saw according to the second embodiment of the present invention.

As shown in FIG. 29, a groove 106c is formed in the bottom surface 106a of the base 106 to communicate with the opening 106b. The groove 106c extends from the front end of the opening 106b to the front end of the base 106 as viewed in the cutting direction. As in the first embodiment, the groove 106c is located on the imaginary line extended in the cutting direction from the saw blade 4 and has a width greater than the thickness of the saw blade 4. The width of the groove 106c is large enough that the imaginary line extended in the cutting direction from the saw blade 4 is within the groove 106c with respect to the widthwise direction of the groove 106c even when the saw blade 4 is tilted by the maximum angle. In other words, the marking line on the cutting object locates within the groove 106c with respect to the widthwise direction of the groove 106c even when the saw blade 4 is tilted by the maximum degree. The base 106 is linked to the housing 102 and/or the saw cover 105.

Figure 31:
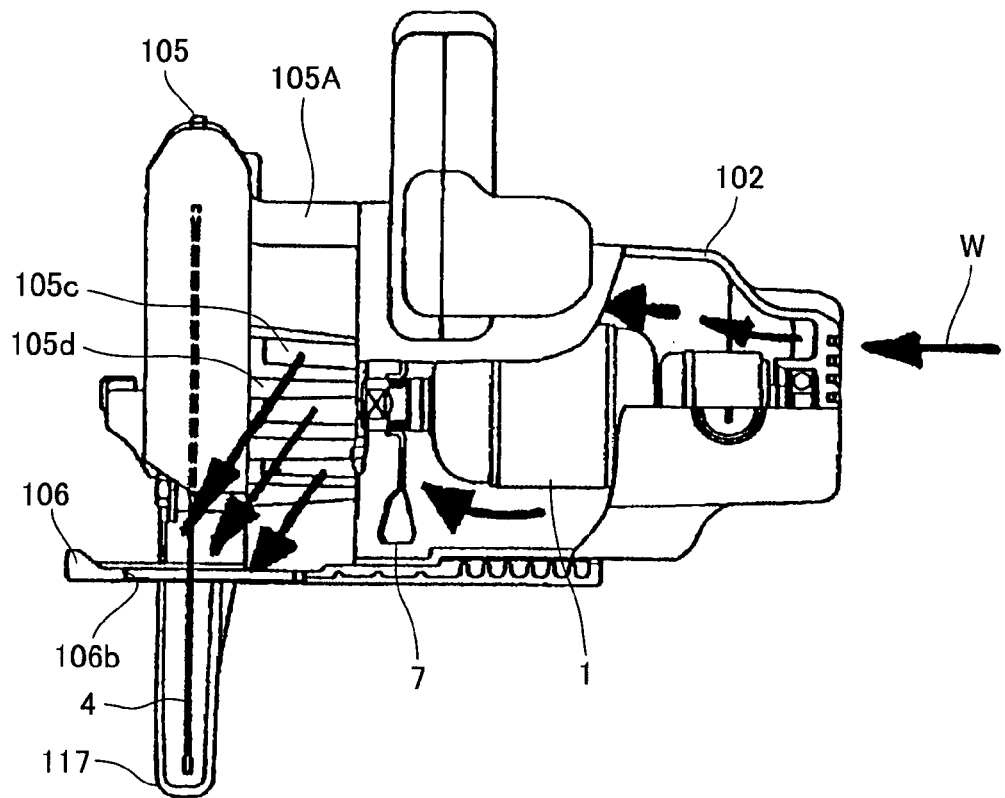
FIG. 31 is a schematic right-side view of the principal part of the portable electric circular saw according to the second embodiment of the present invention.

As shown in FIG. 31, an outer peripheral wall 105A is provided to the saw cover 105 at the end close to the housing 102. The outer peripheral wall 105A includes a plurality of division walls 105d defining a plurality of fanned air discharge ports 105c. As shown in FIG. 29, the division walls 105d are tilting toward the base 106, particularly toward the cutting area within the opening 106b The fanned air discharge ports 105c are located at radially outward position with respect to the rotary shaft of the fan 7 and separate from the fan 7 with respect to the direction parallel to the rotary shaft of the fan 7.

Figure 32:
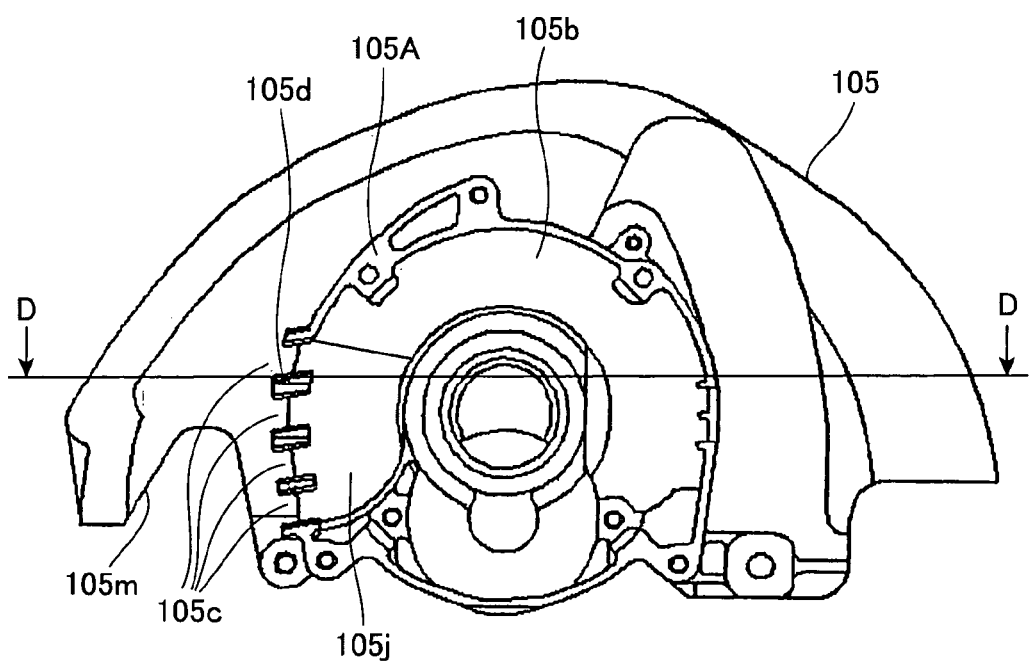
FIG. 32 is a schematic rear view of a saw cover of the portable electric circular saw according to the second embodiment of the present invention.
Figure 33:
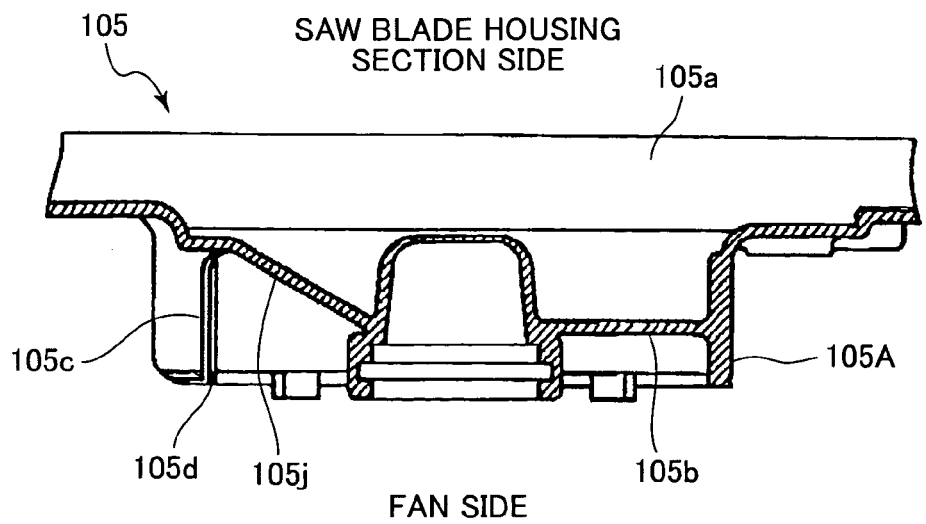
FIG. 33 is a schematic cross-sectional view of the saw cover taken along a line D—D in FIG. 32.
Figure 34:
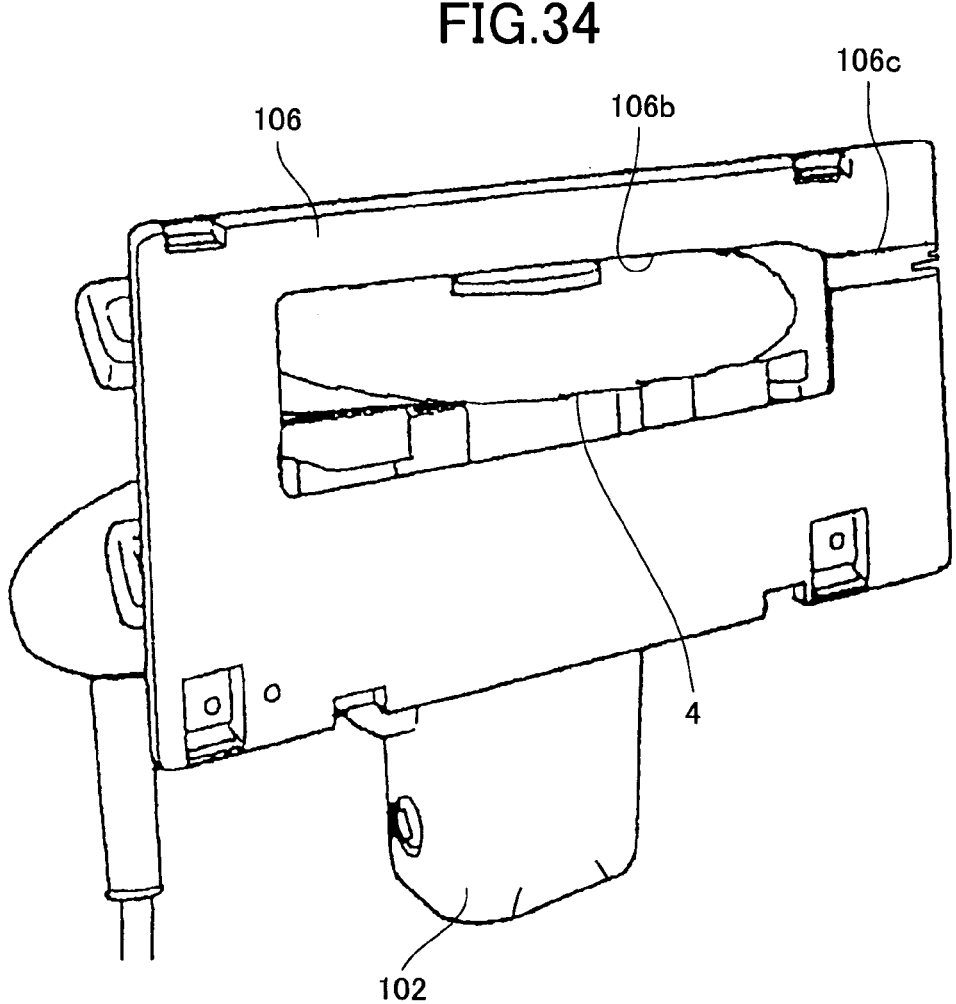
FIG. 34 is a schematic perspective bottom view of the portable electric circular saw according to the second embodiment of the present invention.

As shown in FIGS. 31 and 32, a division wall 105b is provided between the saw blade housing section 105a and the housing 102 so as to separate the saw blade housing section 105a from the housing 102. The division wall 105b blocks and prevents fanned air W from flowing into the saw blade housing section 105a. The division wall 105b has an inclined wall 105j disposed near the fanned air discharge ports 105c. The inclined wall 105j is tilted toward the intersection of the blade edge of the saw blade 4 and the bottom surface 106a of the base 106, such that the distance between the inclined wall 105j and the lateral surface of the saw blade 4 gradually decreases toward the radially outward position with respect to the center of the fan 7. As shown in FIG. 32, a recess 105m is formed in the front side of the saw cover 105 as viewed in the cutting direction for allowing the fanned air W to pass therethrough.

With this configuration, the fanned air W entered inside the outer peripheral wall 105A hits the division wall 105b and flows along the inclined wall surface 105j toward the lateral surface of the saw blade 4. In this manner, the fanned air W is directed toward the opening 106b. Thereafter, the fanned air W passes through the fanned air discharge ports 105c and the recess 105m and is discharged from the saw cover 105 forward in the cutting direction (toward the right side in FIG. 30).

The fanned air W discharged to the outside of the saw cover 105 further flows toward the opening 106b of the base 106, strikes the top surface of the cutting object in an area within the opening 106b, and then diffuses. Afterward, the fanned air W passes through the space between the groove 106c and the top surface of the cutting object, and then the fanned air W is discharged from the front end of the base 106 along the top surface of the cutting object. As a result, the fanned air W blows off and prevents dust from accumulating on the top surface of the cutting object in an area within the opening 106b and also in an area located at the front side of the base 106 as viewed in the cutting direction, improving the visibility of the marking line and the efficiency of cutting operation.

Because the division walls 105d and thus the fanned air discharge ports 105c are arranged so as to discharge the fanned air W forward as viewed in the cutting direction, the fanned air W will not be directed to the user during the cutting operation.

As described above, because the inclined wall surface 105j is provided to the saw cover 105 for guiding the fanned air toward the opening 106b of the base 106, saw dust can be prevented effectively from accumulating on the cutting object without increasing the number of components.

Figure 35:
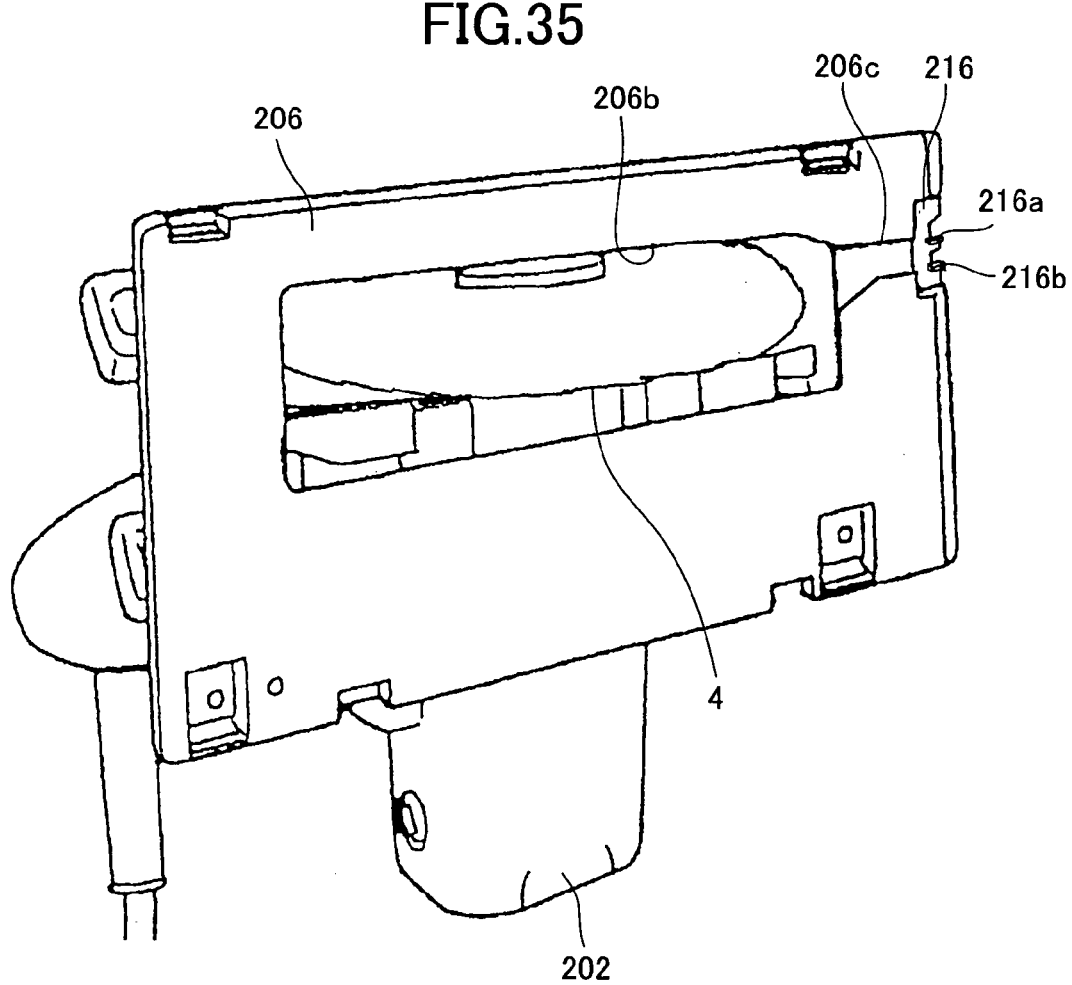
FIG. 35 is a schematic perspective bottom view of a portable electric circular saw according to a third embodiment of the present invention.

Next, a portable electric circular saw according to a third embodiment of the present invention will be described with reference to FIG. 35. The portable electric circular saw of the third embodiment is similar to the portable electric circular saw of the above-described first embodiment or the second embodiment, but differs in a groove formed in a base. As shown in FIG. 35, a base 206 of the present embodiment is formed with a groove 206c whose width with respect to the direction parallel to the rotary shaft of the saw blade 4 increases toward the saw blade 4 such that the housing-side edge of the groove 206c tilts toward the housing 202. Such a groove 206c helps to direct fanned air, which is discharged to a place closed to the housing 202, into the groove 206c as much as possible. As shown in FIG. 35, the portable electric circular saw of the present embodiment includes a guide piece 216 having a vertical cutting guide section 216a and a 45-degree cutting guide section 216b.

Here, the portable electric miter of the third embodiment could be modified so that the other side edge of the groove 206c tilts outward toward the saw blade 4, that is, the edge tilts to the direction opposite to the housing 2 toward the saw blade 4. It is also possible to form the groove 206c such that the depth of the groove 206c increases toward the opening 206b. In this case, the upper wall of the groove 206c locates above the bottom surface 206a of the base 206 at the position close to the opening 206b. In these manner also, it is possible to increase the amount of fanned air introduced into the groove 206c.

Next, portable electric circular saws according to fourth through sixth embodiments of the present invention will be described in this order. The portable electric circular saws of the fourth through sixth embodiments are any of the first through third embodiments provided with an air-blow regulating mechanism to be described later that regulates the amount of fanned air discharged forward from the front end of the base. The air-blow regulating mechanism is particularly effective for a working environment where dispersion or scattering of dust must be obviated. To this effect, in the fourth through sixth embodiments, the air-blow regulating mechanism is provided at a base.

First, the portable electric circular saw according to the fourth embodiment will be described in detail with reference to FIGS. 36 and 37. The air-blow regulating mechanism includes a groove 306f formed in a bottom surface 306a of a base 306, a shield member 351 formed with a long through hole 351a and housed in the groove 306f, and a screw 352 engaged with the base 306 through the hole 351a. The groove 306f is formed at the rear of a hole 306d with respect to the cutting direction. The groove 306f is in fluid communication with the groove 306c and has substantially the same depth as the groove 306c. The shield member 351 is slidable along the groove 306f between a non-shielding position shown in FIG. 36 and a shielding position shown in FIG. 37. The screw 352 locks and unlocks the sliding position of the shield member 351 relative to the base 306. That is, the shield member 351 is slidable within the length of the hole 351a, and its position is fixed by tightening the screw 352.

Figure 36:
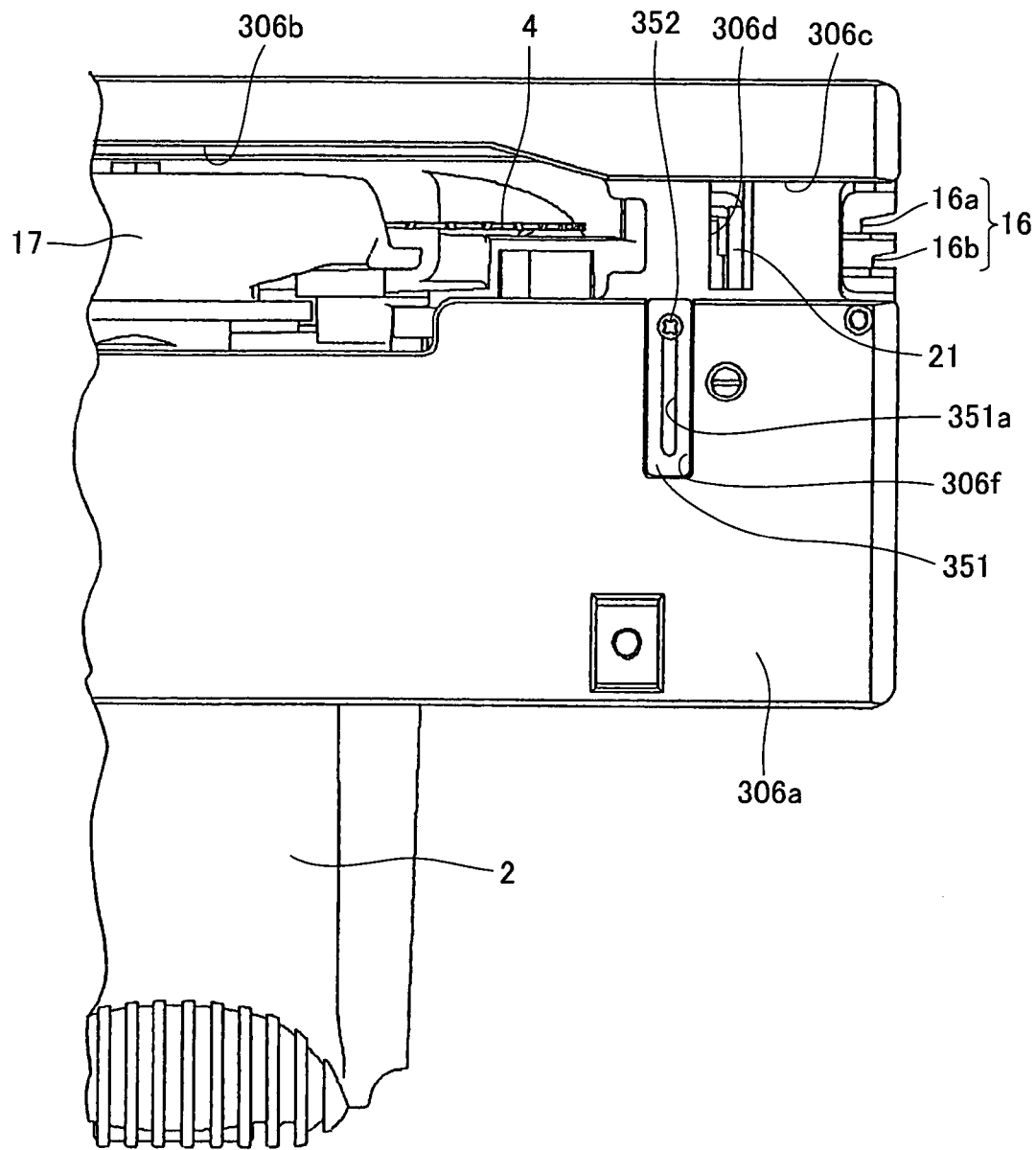
FIG. 36 is a schematic bottom view of a portable electric circular saw according to a fourth embodiment of the present invention with a shield member at a non-shielding position.
Figure 37:
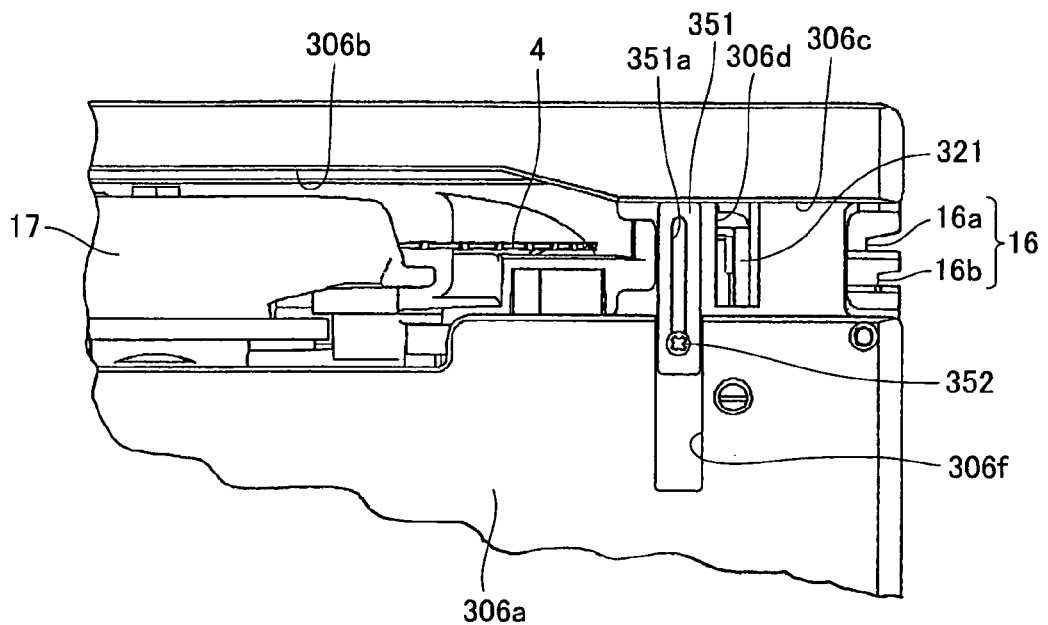
FIG. 37 is a schematic bottom view of the portable electric circular saw according to the fourth embodiment of the present invention with the shield member at a shielding position.

When the shield member 351 is set to the non-shielding position shown in FIG. 36, fanned air discharged toward the opening 306b of the base 306 can flow through the groove 306c and blow forward from the front end of the base 306 as viewed in the cutting direction in a manner described in the above embodiments, thereby preventing saw dust from accumulating. On the other hand, when the shield member 351 is set to the shielding position shown in FIG. 37, the shield member 351 blocks the groove 306c so that the fanned air hits the shield member 351 and cannot pass through the groove 306c. Therefore, the fanned air is prevented from blowing forward from the front end of the base 306, thereby preventing saw dust from being dispersed at the front end of the base 306. In this manner, it is possible to selectively prevent the dispersion of saw dust as desired.

Further, if the user sets the shield member 351 at a position between the shielding position and the non-shielding position, the amount of the fanned air discharged forward through the groove 306c is regulated. That is, the user can utilize the blower mechanism while minimizing the dispersion of saw dust.

As described above, according to the present embodiment, the air-blow regulating mechanism can regulate the amount of the fanned air that blows out from the opening at the front end of the base, saw dust can be prevented from being dispersed in a work site where dispersion of saw dust should be obviated. Also, it is possible to prevent saw dust from being accumulated on the marking line on the cutting object while minimizing the dispersion of saw dust by decreasing the flow amount of fanned air. Saw dust can be prevented selectively from being dispersed depending on the requirements of the work site.

Next, the portable electric circular saw according to the fifth embodiment of the present invention will be described with reference to FIGS. 38–40. An air-blow regulating mechanism according to the present embodiment includes a male threaded hole 406f formed in a base 406 at a position corresponding to a groove 406c, a shield member 451 formed with a through hole 451a, a screw 452 inserted into the through hole 451a and engaged with the male threaded hole 406f, and a spring 453 mounted around the screw 452. The shield member 451 has an L-shaped cross section and includes a support section that extends in the horizontal direction and a shield section that extends in the vertical direction. The shield member 451 has a width substantially equal to the width of the groove 406c in a direction parallel to the rotary shaft of the fan 7 (in a direction perpendicular to the sheet of FIG. 38). The spring 453 is interposed between the shield member 451 and the top surface of the base 406 and urges the shield member 451 upwardly. The base 406 is formed with a through hole 406d through which the shield section of the shield member 451 can pass. A user can slide the shield member 451 upward and downward between a non-shielding position shown in FIG. 38 and a shielding position shown in FIG. 40 by turning the screw 452.

Figure 38:
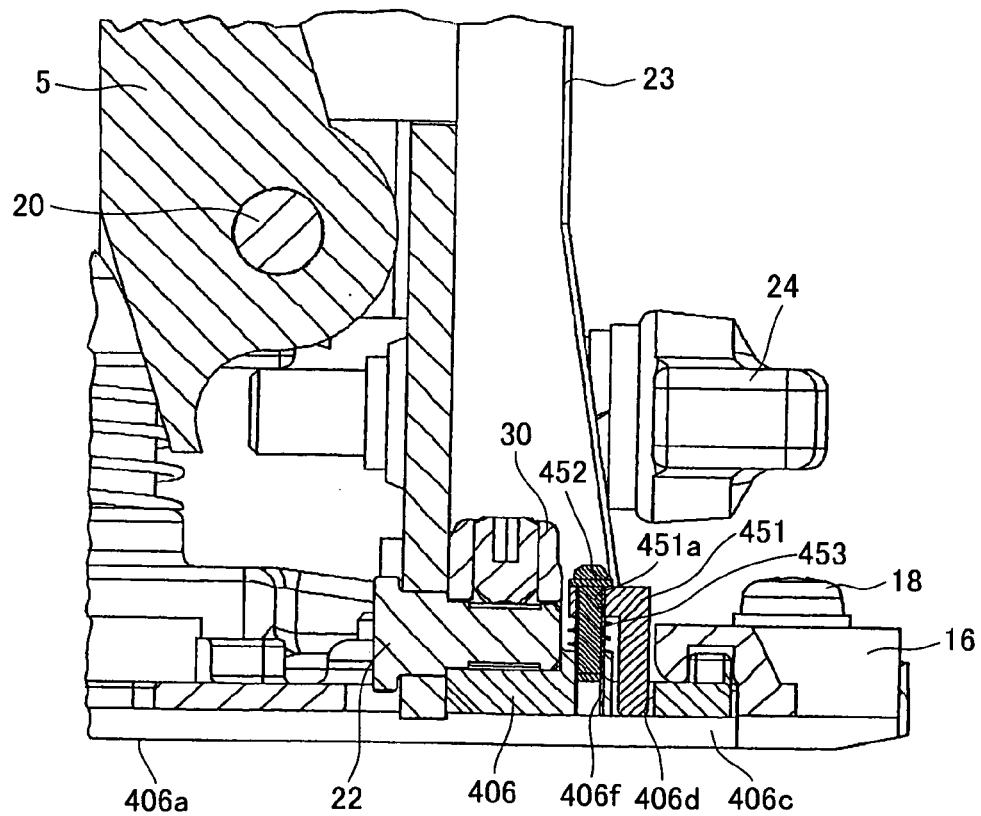
FIG. 38 is a schematic cross sectional view of a portable electronic circular saw according to a fifth embodiment of the present invention with a shield member at a non-shielding position.

When the shield member 451 is set to the non-shielding position shown in FIG. 38, fanned air can flow through the groove 406c formed in a bottom surface 406a of the base 406 and blow forward in the cutting direction from the base 406. On the other hand, when the shield member 451 is set to the shielding position shown in FIG. 40, then fanned air strikes the shield member 451 and hence cannot be directed forward in the cutting direction. Therefore, the fanned air is not introduced into the groove 406c and prevented from blowing out forward from the front end of the base 406. In this manner, saw dust is prevented from being dispersed during the cutting operation.

Figure 39:
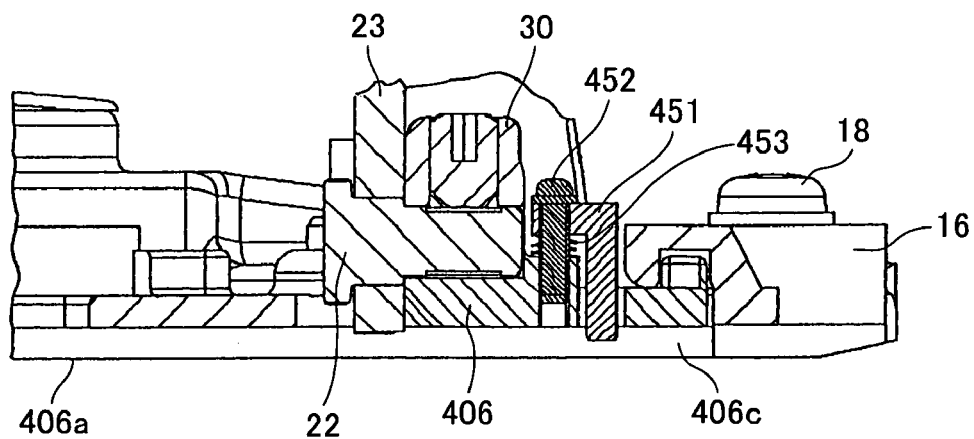
FIG. 39 is a schematic cross sectional view of the portable electric circular saw according to the fifth embodiment of the present invention with the shield member at an adjusting position.
Figure 40:
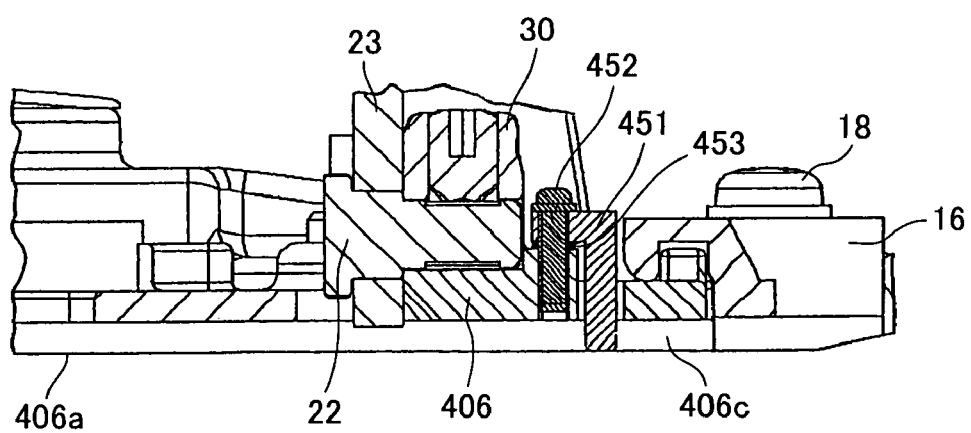
FIG. 40 is a schematic cross sectional view of the portable electric circular saw according to the fifth embodiment of the present invention with the shield member at a shielding position.

Further, when the shield member 451 is set to a regulating position shown in FIG. 39, the amount of fanned air that is discharged forward from the base 406 is decreased. Therefore, saw dust is prevented from accumulating on the marking line while minimizing the dispersion of saw dust.

Figure 41:
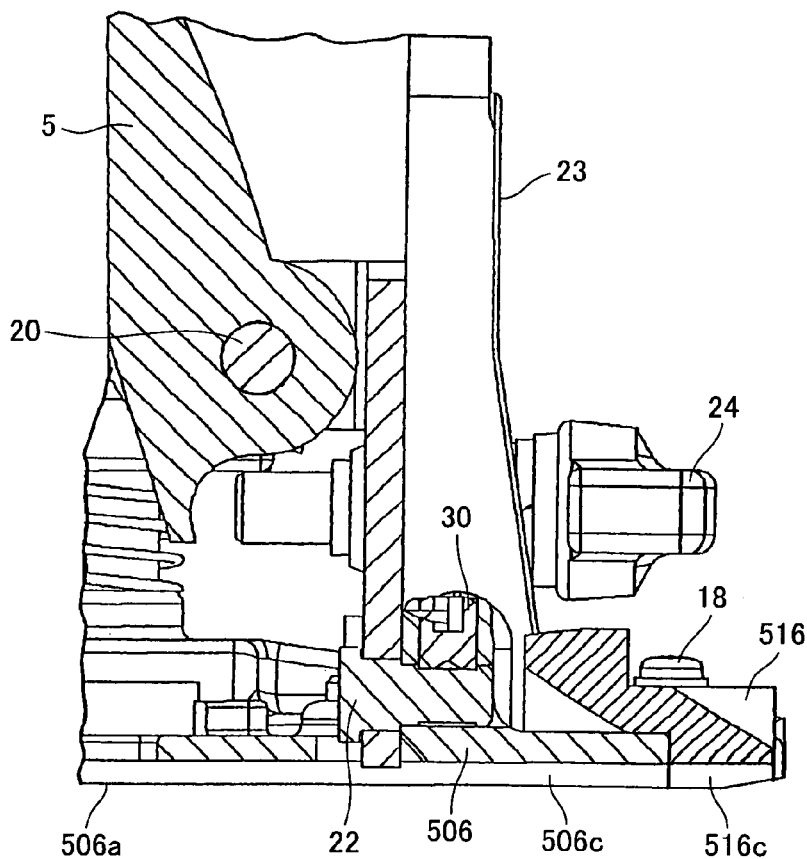
FIG. 41 is a schematic cross sectional view of a portable electric circular saw according to a sixth embodiment of the present invention with a guide piece fitted to a base with its non-shield side facing downward.
Figure 42:
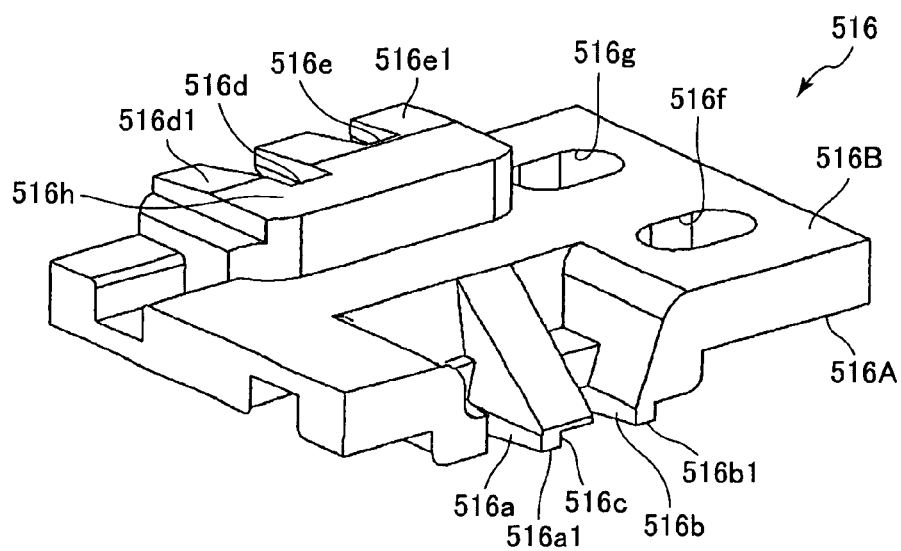
FIG. 42 is a schematic perspective view of the guide piece of FIG. 41 with the non-shield side facing downward.
Figure 43:
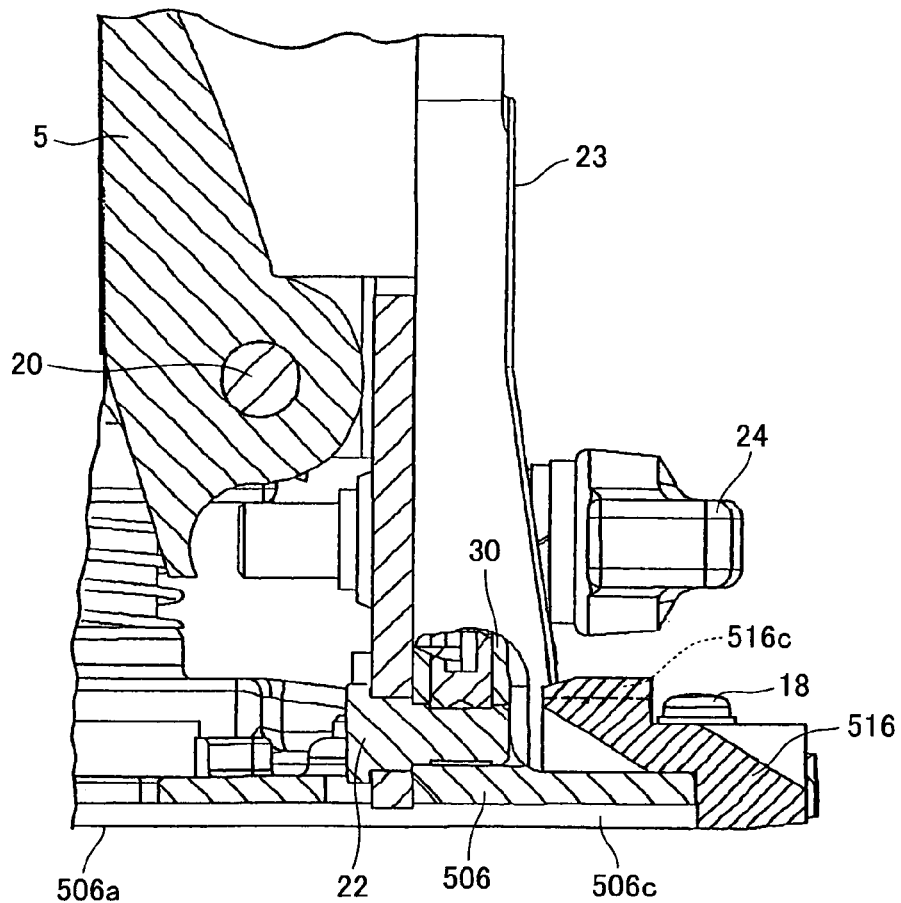
FIG. 43 is a schematic cross sectional view of the portable electric circular saw according to the sixth embodiment of the present invention with the guide piece fitted to the base with its shield side facing downward.
Figure 44:
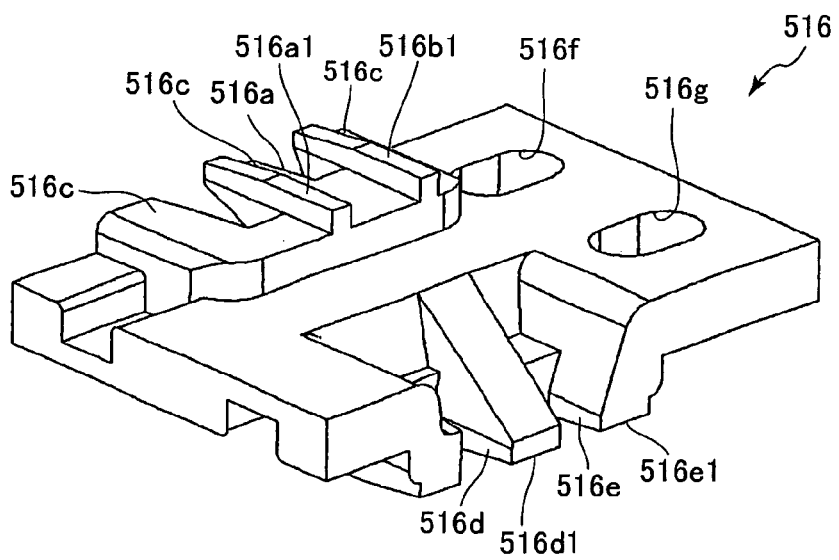
FIG. 44 is a schematic perspective view of the guide piece of FIG. 43 with its shield side facing downward.

Next, the portable electric circular saw according to the sixth embodiment of the present invention will be described with reference to FIGS. 41–44. The portable electric circular saw according to the present embodiment includes a guide piece 516 equipped with the air-flow regulating mechanism. As shown in FIGS. 41 and 43, the guide piece 516 has a non-shield side 516A and a shield side 516B and is detachably fitted to the top surface of a base 506 by a screw 18. Usually, the guide piece 516 is fitted to the base 506 with the non-shield side 516A facing downward as shown in FIG. 41. However, when the blower mechanism is not used, the guide piece 516 is turned upside down and fitted to the base 506 with the shield side 516B facing downward as shown in FIG. 43.

The non-shield side 516A of the guide piece 516 is provided with guide sections 516a and 516b. The guide section 516a is for indicating the edge position of the saw blade 4 when the saw blade 4 is in the upright posture. The guide section 516b is for indicating the edge position of the saw blade 4 when the saw blade 4 is tilted by the maximum angle of 45 degree. Projections 516a1 and 516b1 are projecting from the bottom surfaces of guide sections 516a and 516b, respectively, and extend in the cutting direction, thereby defining grooves 516c between and both sides of the guide sections 516a and 516b. When the guide piece 516 is fitted to the base 506 with the non-shield side 516A facing downward as shown in FIG. 41, the projections 516a1 and 516b1 reach the level substantially equal to (flush with) the bottom surface 506a of the base 506.

On the other hand, the shield side 516B of the guide piece 516 is provided with guide sections 516d and 516e. The guide section 516b is for indicating the edge position of the saw blade 4 when the saw blade 4 is in the upright posture. The guide section 516e is for indicating the edge position of the saw blade 4 when the saw blade 4 is tilted by the maximum angle of 45 degree. A shield section 516h is disposed to the shield side 516B of the guide piece 516. The shield section 516h has a width substantially equal to the width of the groove 506c. When the guide piece 516 is fitted to the base 506 with the shield side 516B facing downward as shown in FIG. 42, the shield section 516h reaches the level substantially equal to the bottom surface 506a of the base 506.

With this configuration, when the guide piece 516 is fitted to the base 506 with the non-shield side 516A facing downward as shown in FIG. 41, fanned air flows through the grooves 506c and 516c and blows frontward from the front end of the base 506. On the other hand, when the guide piece 516 is fitted to the base 506 with the shield side 516B facing downward as shown in FIG. 43, the shield section 516h blocks the fanned air and prevents the same from passing through the groove 506c, so that the fanned air is not discharged from the front end of the base 506. In this manner, the blower mechanism can be turned ON and OFF by selecting the side of the guide piece 516 to fit to the base 506. Here, the guide piece 516 is fitted to the base 506 by the screw 18, which is inserted through either one of a through hole 516f and a hole 516g. The through hole 516f is used when the non-shield side 516A is faced downward, and the through hole 516g is used when the shield side 516B is faced downward.

Next, portable electric circular saws according to seventh to ninth embodiments of the present invention will be described in this order. The portable electric circular saws according to these embodiments each includes an air-blow regulating mechanism provided to a saw cover.

Figure 47:
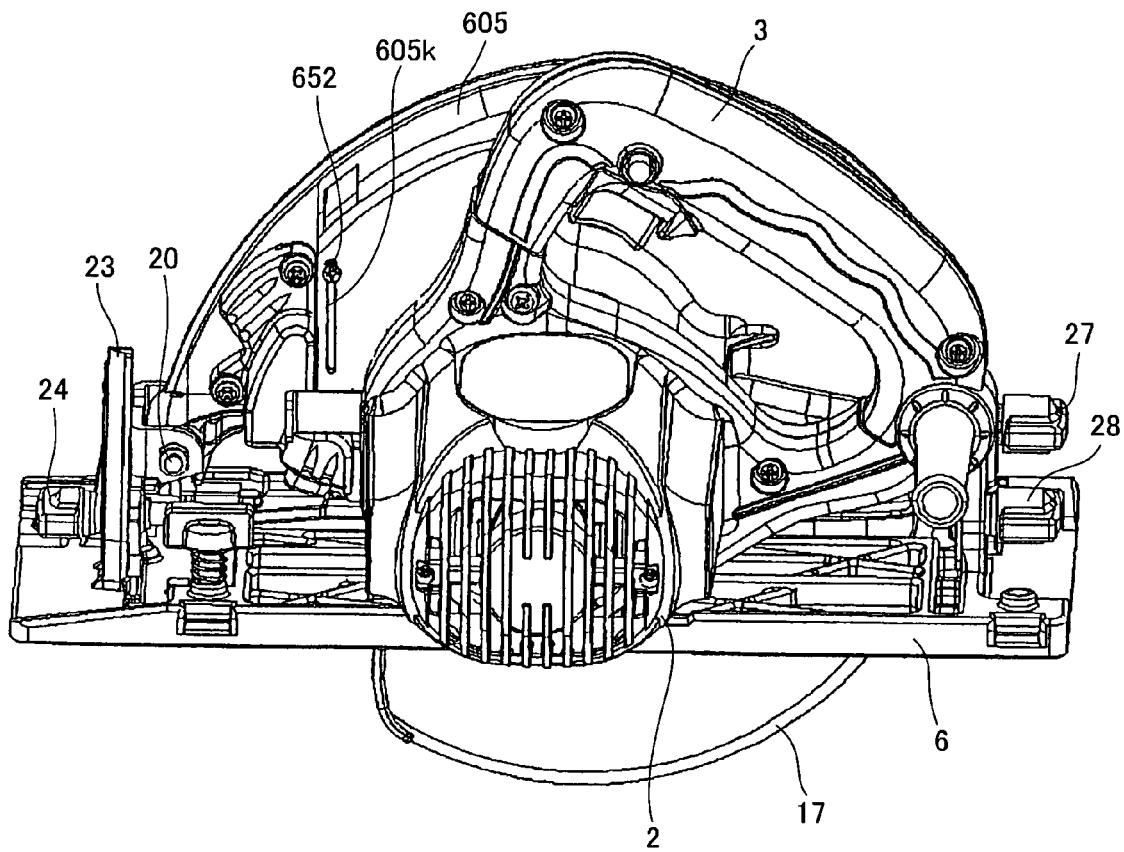
FIG. 47 is a schematic perspective rear view of the portable electric circular saw according to the seventh embodiment of the present invention.
Figure 48:
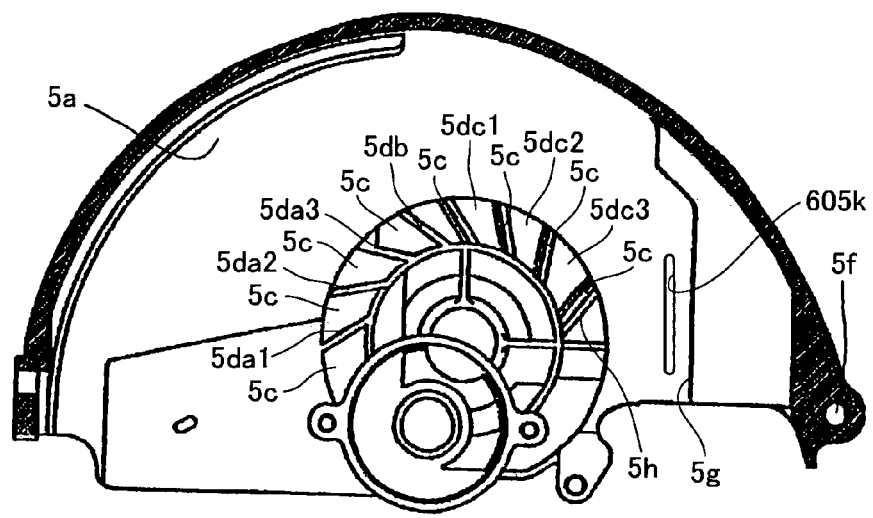
FIG. 48 is a schematic cross-sectional view of a saw cover of the portable electric circular saw according to the seventh embodiment of the present invention taken along a line corresponding to the line C—C in FIG. 18.

First, the portable electric circular saw according to the seventh embodiment will be described with reference to FIGS. 45–48. The portable electric circular saw is similar to that of the first embodiment, but differs in including the air-blow regulating mechanism. The air-blow regulating mechanism includes a shield member 651 slidable up and down along the step 5g that is formed on the saw cover 5 to extend in the vertical direction. The shield member 651 is formed to L-shape having a step sliding section 651A and a saw-cover sliding section 651B. The step sliding section 651A contacts and slides along the step 5g, and the saw-cover sliding section 651B contacts and slides along the saw cover 605. A saw cover 605 is formed with a vertically extending slot 605k (FIGS. 47 and 48). A screw 652 is inserted through the slot 605k and engaged with the saw cover sliding section 651B. With this configuration, the shield member 651 can slides up and down within the length of the slot 605k, and the position of the shield member 651 is secured by tightening the screw 652.

Figure 45:
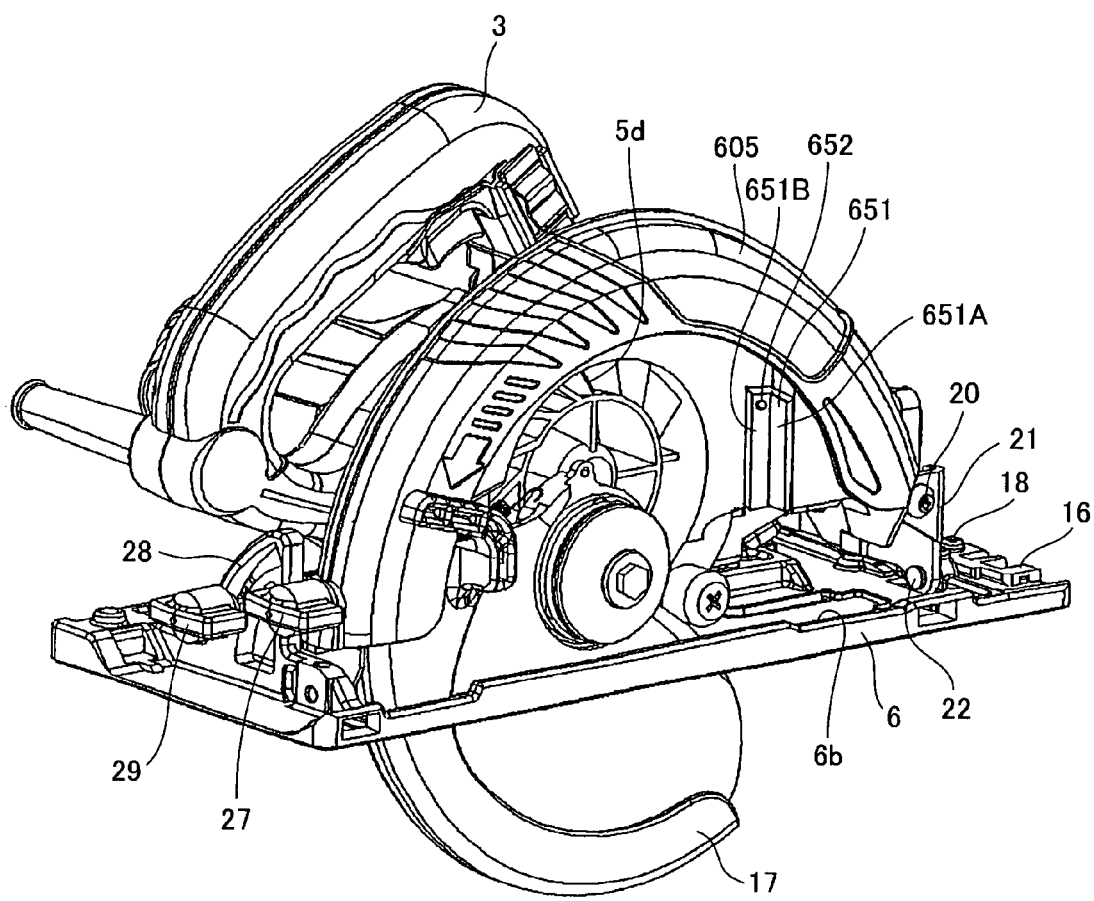
FIG. 45 is a schematic perspective view of a portable electric circular saw according to a seventh embodiment of the present invention with a saw blade removed and a shield member at a non-shielding position.

When the screw 652 abuts the top end of the slot 605k as shown in FIG. 45, the shield member 651 is placed to a non-shielding position that is the top position. In this case, fanned air flows toward the opening 6b of the base 6, forward in the cutting direction, after or without striking the step sliding section 651A of the shield member 651. Accordingly, the fanned air can blow out from the front end of the base 6 after passing through the groove 6c.

Figure 46:
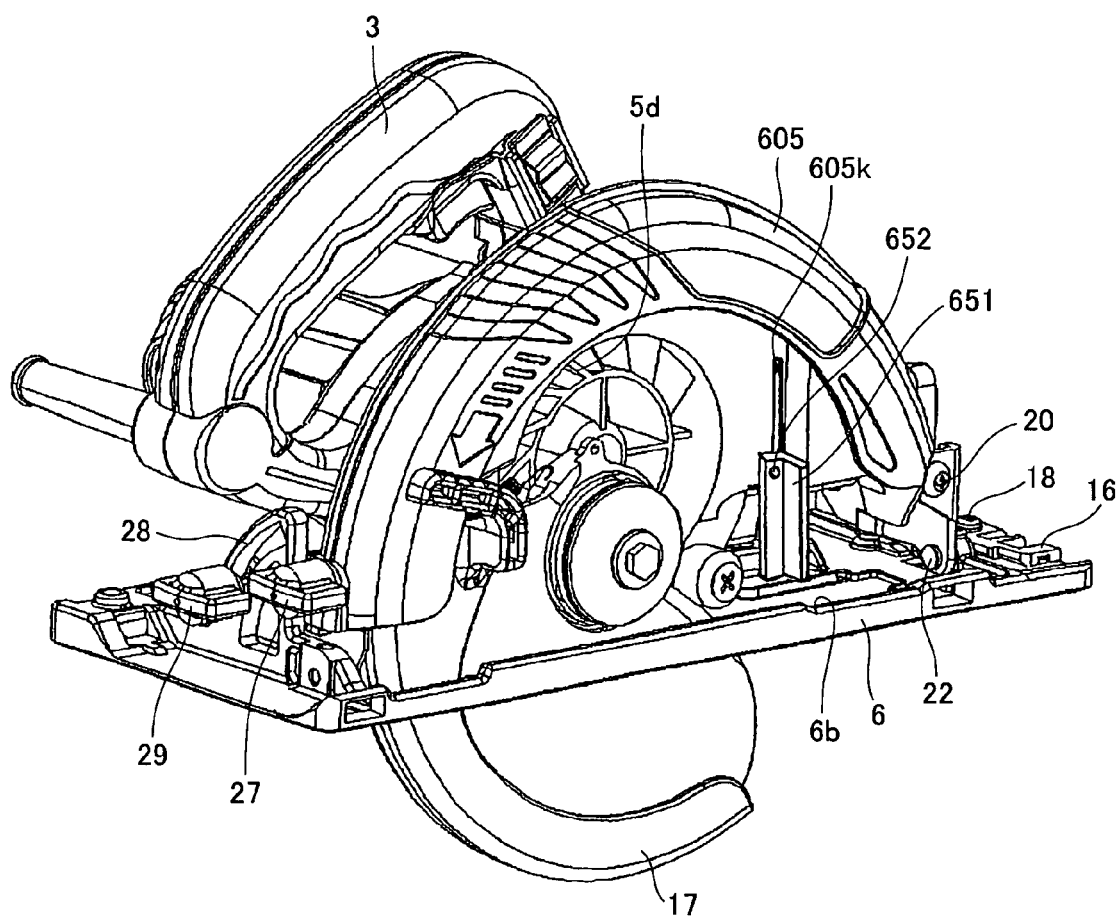
FIG. 46 is a schematic perspective view of the portable electric circular saw according to the seventh embodiment of the present invention with the saw blade removed and the shield member at a shielding position.

On the other hand, when the screw 652 abuts the bottom end of the slot 605k as shown in FIG. 46, the shield member 651 is in a shielding position that is the bottom position. In this case, fanned air directed toward the opening 6b strikes the shield member 651 so that the fanned air cannot flow forward in the cutting direction. Therefore, the fanned air does not enter the groove 6c, and thus the fanned air is not discharged from the front end of the base 606.

Further, when the shield member 651 is posited between the non-shielding position and the shielding position, then the amount of fanned air discharged forward from the front end of the base 606 is regulated. Accordingly, saw dust can be prevented from accumulating on the marking line on the cutting object while minimizing the dispersion of saw dust.

Here, because the step 5g guides the shield member 651 when the shield member 651 slides up and down, only a single screw 652 can sufficiently secure the shield member 651 in position.

Next, the portable electric circular saw according to the eighth embodiment of the present invention will be described with reference to FIGS. 49–52. The portable electric circular saw is similar to that of the seventh embodiment, but differs in a direction in which a shield member slides.

Figure 50:
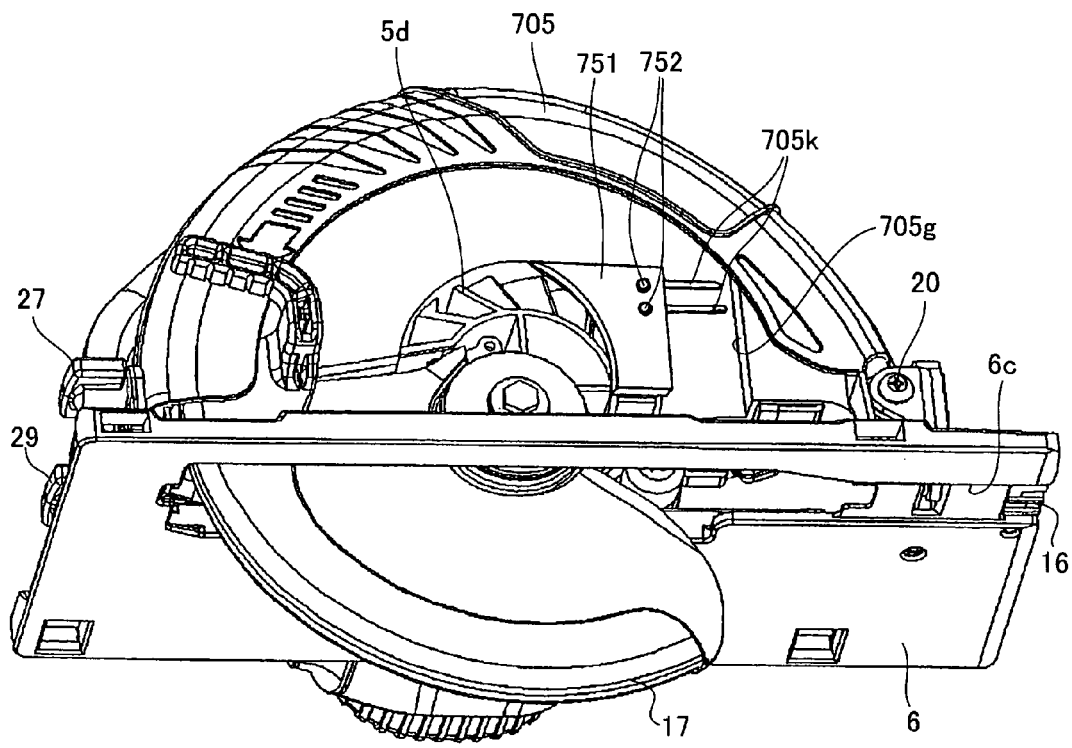
FIG. 50 is a schematic perspective bottom-side view of the portable electric circular saw according to the eighth embodiment of the present invention with the saw blade removed and the shield member at a shielding position.
Figure 51:
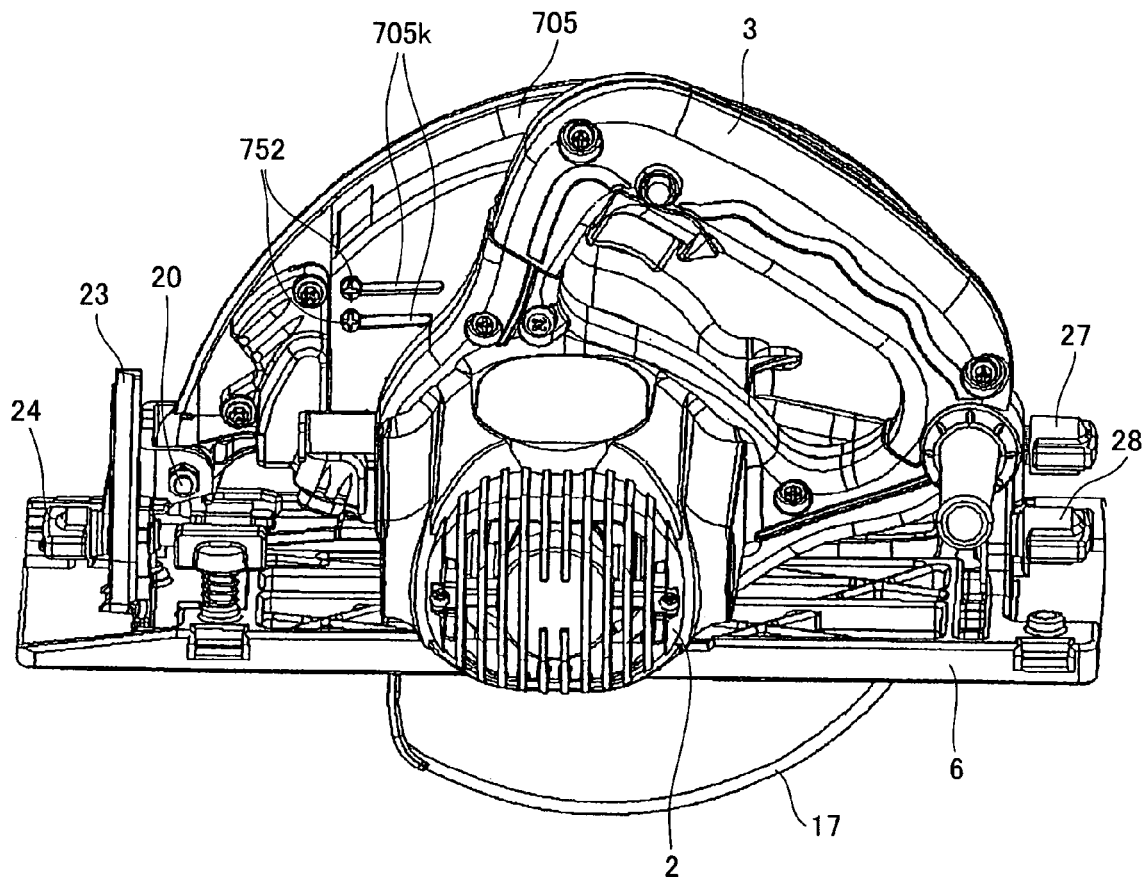
FIG. 51 is a schematic perspective rear-side view of the portable electric circular saw according to the eighth embodiment of the present invention.
Figure 52:
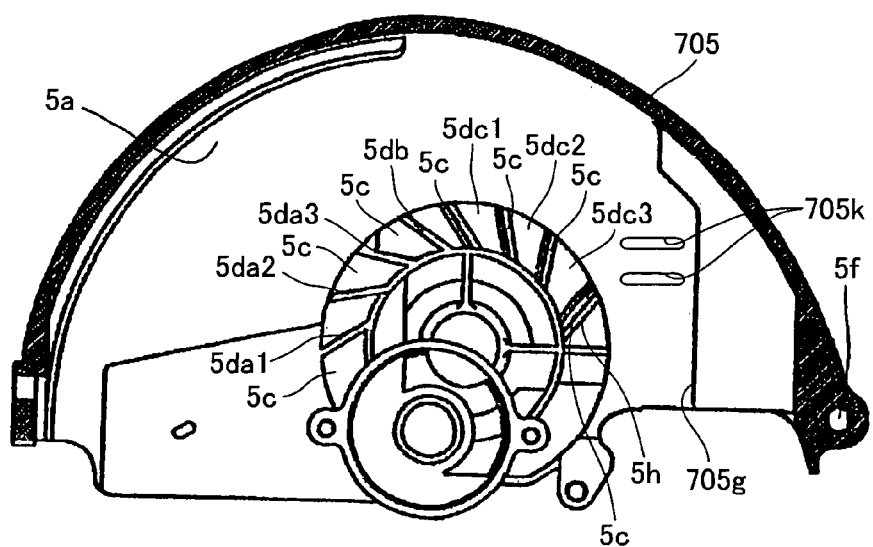
FIG. 52 is a schematic cross sectional view of a saw cover of the portable electric circular saw according to the eighth embodiment of the present invention taken along a line corresponding to the line C—C in FIG. 18.

Specifically, the air-blow regulating mechanism of the present embodiment includes a shield member 751 that is slidable forward and rearward in the cutting direction along the surface of a saw cover 705. The shield member 751 is in a substantially quadrilateral shape having a first side substantially parallel to a step 705g, a second side substantially perpendicular to the first side, a third side substantially parallel to the second side, and a fourth side in an arc-shape following the radially outer edges of the division walls 5d-As shown in FIGS. 50–52, the saw cover 705 is formed with a pair of slots 705k, 705k extending substantially parallel to the cutting direction. A pair of screws 752 are inserted through the corresponding slots 705k, 705k and engaged with the shield member 751. With this configuration, the shield member 751 can slide to the front and to the rear within the length of the slots 705k, and the position of the shield member 751 is secured by tightening the screws 752.

Figure 49:
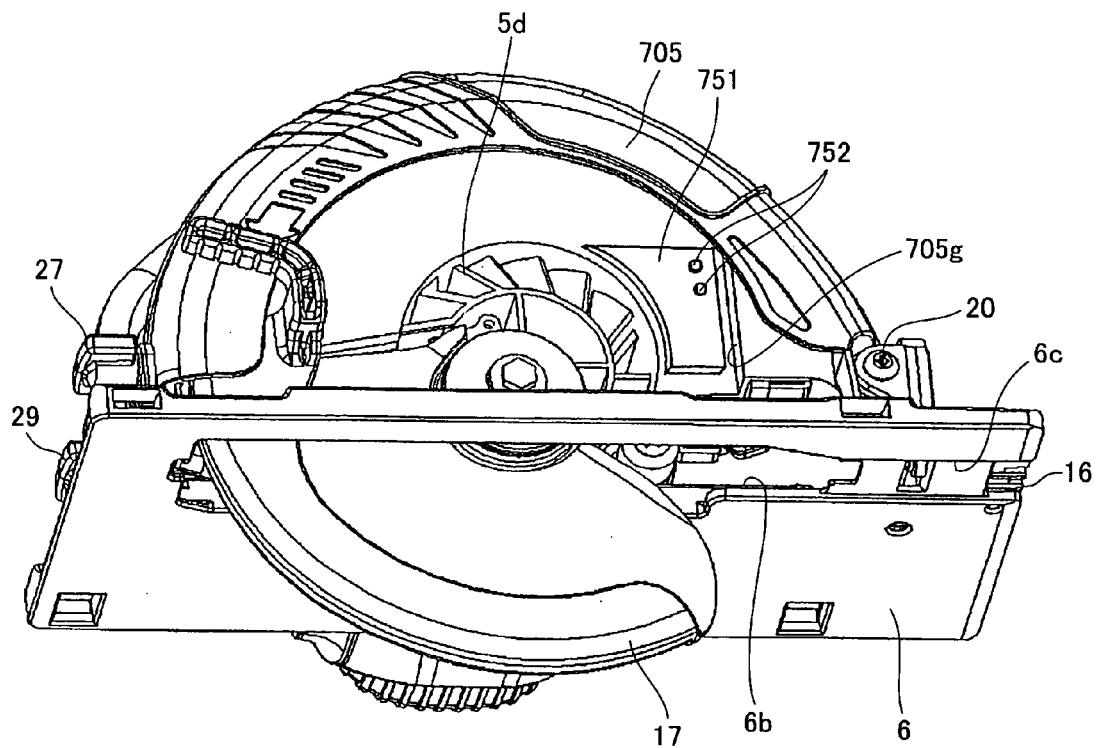
FIG. 49 is a schematic perspective bottom-side view of a portable electric circular saw according to an eighth embodiment of the present invention with a saw blade removed and a shield member at a non-shielding position.

When the screws 752 abut the front ends of the slots 705k as shown in FIG. 49, the shield member 751 is at a non-shielding position. In this case, the fanned air discharge ports 5c are fully opened without being blocked by the shield member 751, and therefore fanned air can be directed forward toward the opening 6b of the base 6 in the cutting direction. Accordingly, the fanned air can be discharged from the front end of the base 6 after passing through the groove 6c.

On the other hand, when the screws 752 abut the left ends of the slots 705k as shown in FIG. 50, the shield member 751 is at a shielding position. In this case, the shield member 751 closes most parts of the fanned air discharge ports 5c. Therefore, fanned air is not directed frontward, that is, to the groove 6c, and is prevented from blowing out forward from the front end of the base 6. When the shield member 751 is positioned between the non-shielding position and the shielding position, then the amount of fanned air discharged forward from the base 706 is regulated.

Next, the portable electric circular saw according to the ninth embodiment of the present invention will be described with reference to FIGS. 53–55. The portable electric circular saw of the present embodiment is similar to that of the second embodiment, but differs in including the air-blow regulating mechanism.

The air-blow regulating mechanism includes a shield member 851 slidably disposed on the outer surface of an outer wall 805A at the front side of the saw cover 805 as viewed in the cutting direction. More specifically, the shield member 851 is formed with a vertically extending slot 851a, and a screw 852 is inserted through the slot 851a and engaged with the outer wall 805A.

Figure 53:
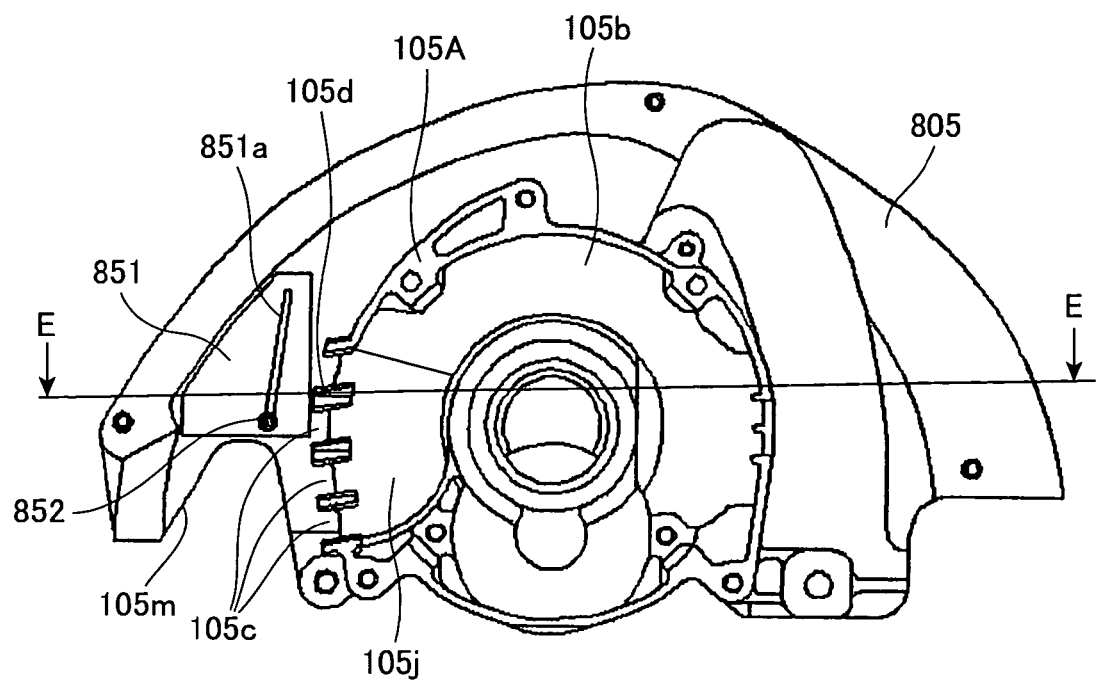
FIG. 53 is a schematic rear view of a saw cover and a shield member at a non-shielding position of a portable electric circular saw according to a ninth embodiment of the present invention.

When the screw 852 is in abutment with the bottom end of the slot 851a as shown in FIG. 53, the shield member 851 is in a non-shielding position that is the top position. In this case, a recess 805m formed at the front side of the saw cover 805 is not covered by the shield member 851. Therefore, fanned air discharged from fanned air discharge ports 805c can pass through the recess 805m, flow forward toward the base opening 6b, and blow out from the front end of the base 6 after passing through the groove 6c.

Figure 54:
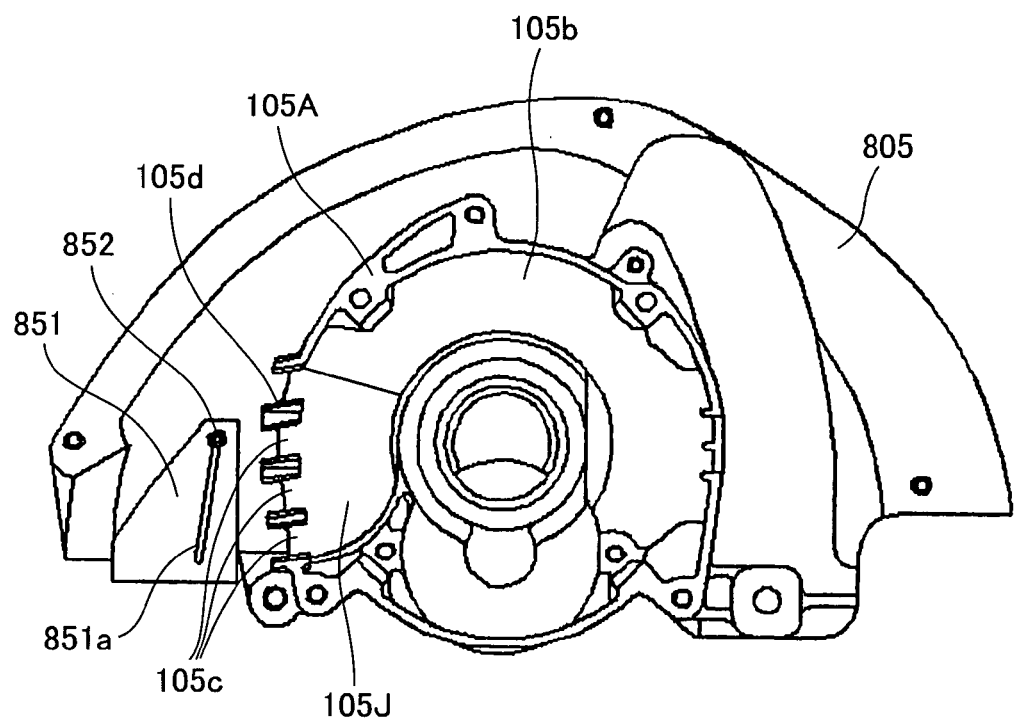
FIG. 54 is a schematic rear view of the saw cover and the shield member at a shielding position of the portable electric circular saw according to the ninth embodiment of the present invention.
Figure 55:
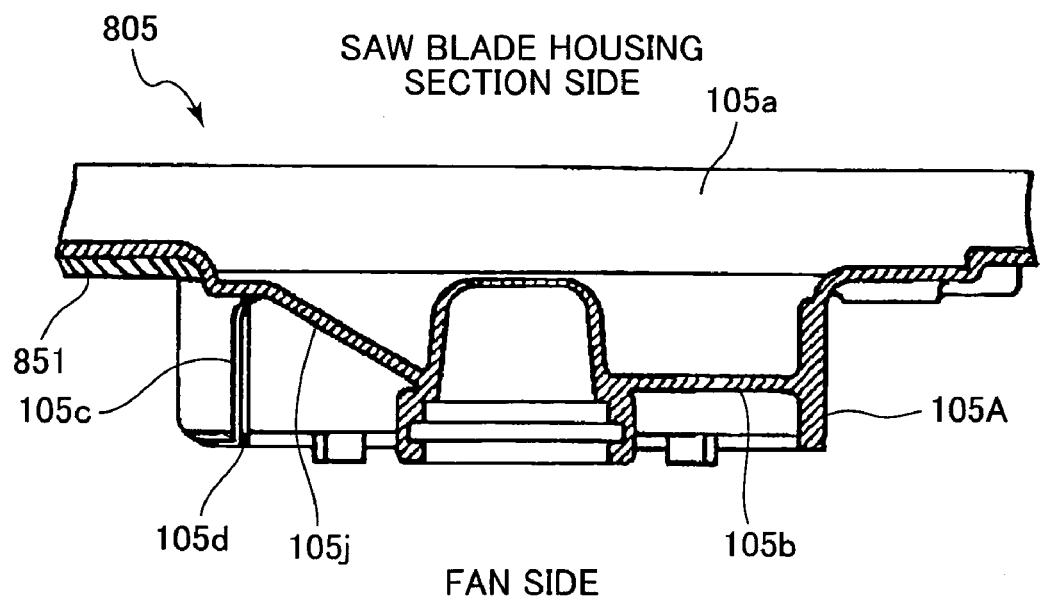
FIG. 55 is a schematic cross sectional view taken along a line E—E in FIG. 53.

On the other hand, when the screw 852 is in abutment with the top end of the slot 851a as shown in FIG. 54, the screw 852 is in a shielding position that is the bottom position. In this case, the shield member 851 covers the recess 805m and therefore, the fanned air W discharged from the fanned air discharge ports 805c is blocked by the shield member 851 and thus prevented from flowing into the groove 6c of the base 6. Accordingly, the fanned air is prevented from discharged from the front end of the base 6.

When the shield member 751 is positioned between the non-shielding position and the shielding position, then the amount of fanned air discharged forward from the base 706 is regulated.

While some exemplary embodiments of this invention have been described in detail, those skilled in the art will recognize that there are many possible modifications and variations which may be made in these exemplary embodiments while yet retaining many of the novel features and advantages of the invention.

What is claimed is:

1. A portable electric cutting device comprising:
    a saw blade that cuts an object in a cutting direction;
    a casing that partially houses the saw blade; and
    a base linked to the casing, the base having a bottom surface that slides on the object, the bottom surface being formed with an opening through which the saw blade projects downward beyond the bottom surface, the bottom surface being formed with a first groove extending forward in the cutting direction from a front end of the opening to a front end of the base, the first groove being in fluid communication with the opening and being opened to the front end of the base.

2. The portable electric cutting device according to claim 1, further comprising a guide piece removably attached to the front end of the base for indicating a position of a blade edge of the saw blade, the guide piece having a bottom surface formed with a second groove that is in fluid communication with the first groove.

3. The portable electric cutting device according to claim 1, wherein a partition wall of a saw cover is further formed with a step at a first side, the step having a lower end that is located rear of the opening formed in the base with respect to the cutting direction.

4. The portable electric cutting device according to claim 3, further comprising a light irradiation device that irradiates the front end of the base and the cutting object in an area in front of the base in the cutting direction, wherein the partition wall of the saw cover is further formed with a recess at a second side opposite to the first side, and the step of the partition wall is formed as a result of forming the recess, the recess having a flat section extending in parallel with the saw blade, and the light irradiation device is attached to the flat section of the recess.

5. The portable electric cutting device according to claim 1, wherein the first groove is located on an imaginary line extending in the cutting direction from the saw blade and has a width greater than a thickness of a blade edge of the saw blade.

6. The portable electric cutting device according to claim 5, further comprising a tilting mechanism arranged between a saw cover and the base, the tilting mechanism tilting the saw cover by a desired angle and supporting the saw cover at the desired angle, wherein the first groove is located on the imaginary line even when the saw blade is tilted by a maximum angle.

7. The portable electric cutting device according to claim 1, further comprising a cutting depth regulating mechanism, wherein a saw cover is connected to the base at front and rear sides of the base, the saw cover being pivotable about a front end of the saw cover with respect to the base, and the cutting depth regulating mechanism is disposed between the rear side of the base and the saw cover for regulating a cutting depth by pivoting the saw cover about the front end of the saw cover relative to the base such that a rear end of the saw cover moves up and down, the cutting depth regulating mechanism supporting the saw cover at a desired position with respect to a pivotal direction of the saw cover.

8. The portable electric cutting device according to claim 1, further comprising a reinforcement member disposed on a top surface of the base, the reinforcement member extending between an area vertically above the first groove and an area vertically above where the first groove is not formed.

9. The portable electric cutting device according to claim 8, further comprising a tilting mechanism disposed between a saw cover and the front side of the base for tilting the saw cover by a desired angle with respect to a vertical direction and for supporting the saw cover at the desired angle, the tilting mechanism having a pin about which the saw cover tilts, the pin being held by the reinforcement member.

10. The portable electric cutting device according to claim 9, wherein the tilting mechanism further has a bevel plate projecting upward from the base and being formed with an arc-shaped hole centered at the pin and a locking screw engaged with the saw cover at a front end through the arc-shaped hole, the locking screw securing the saw cover at the desired angle when tightened, and the reinforcement member is linked to the bevel plate.

11. The portable electric cutting device according to claim 1, further comprising a fan that generates an air current as fanned air, wherein the casing includes a housing that houses the fan and a saw cover that includes a saw blade housing section that partially houses the saw blade, and the saw cover has a partition wall disposed between the fan and the saw blade housing section, the partition wall being formed with a plurality of division walls defining a plurality of discharge ports through which the fanned air generated inside the housing is discharged forward in the cutting direction toward the opening formed in the base, wherein the first groove is an air-passing groove.

12. The portable electric cutting device according to claim 11, further includes a motor that drives both the saw blade and the fan to rotate, the fan generates the fanned air to cool the motor.

13. The portable electric cutting device according to claim 11, wherein: the fan rotates in a rotary direction to generate the fanned air; each of the plurality of division walls extends from a fan side to a saw-blade-housing-section side and has an upstream-side surface at an upstream side in the rotary direction of the fan; at least one of the division walls is a first division wall that has an inclined part whose upstream-side surface is inclined with respect to a rotary axis of the fan such that a saw-blade-housing-section-side section of the upstream-side surface locates downstream of a fan-side section of the upstream-side surface with respect to the rotary direction of the fan; and the fanned air generated inside the housing is discharged through the discharge ports into the saw blade housing section of the saw cover.

14. The portable electric cutting device according to claim 13, wherein each of the division walls has a downstream-side surface opposite to the upstream-side surface, the downstream-side surface being substantially parallel to the corresponding upstream-side surface.

15. The portable electric cutting device according to claim 13, wherein the first division wall is located at a front side of the rotary axis of the fan with respect to the cutting direction.

16. The portable electric cutting device according to claim 13, wherein the first division wall has a flow rate reducing part whose upstream-side surface extends substantially parallel to the rotary axis of the fan, the flow rate reducing part being disposed at the fan-side section whereas the inclined part is disposed at the saw-blade-housing-section-side section, wherein the inclined part is a guiding part extending at an angle with respect to the upstream-side surface of the flow rate reducing part.

17. The portable electric cutting device according to claim 16, wherein the flow rate reducing part is connected to the guiding part, and a boundary between the flow rate reducing part and the guiding part is in an angular shape without being chamfered.

18. The portable electric cutting device according to claim 16, wherein each division wall has a first end at the saw-blade-housing-section-side section and a second end at the fan-side section opposite to the first end, and the first end of the first division wall and the second end of an adjacent division wall located to the downstream side of the first division wall with respect to the rotary direction define a gap therebetween, the gap extending through the partition wall in a direction substantially parallel to the rotary axis of the fan.

19. The portable electric cutting device according to claim 18, wherein the gap is defined between the upstream-side surface of one first division wall and the downstream-side surface of another first division wall adjacent to the one first division wall, the upstream-side surface of the one first division wall and the downstream-side surface of the another first division wall extend substantially in parallel with each other.

20. The portable electric cutting device according to claim 13, wherein at least one of the division walls is a second division wall located at a rear side of the rotation axis of the fan with respect to the cutting direction, the upstream-side surface of each second division wall extends parallel to the rotation axis of the fan.

21. The portable electric cutting device according to claim 13, wherein the upstream-side surface of at least one division wall extends at an angle with respect to a radial direction of a rotary shaft of the fan such that a radially outer part of the upstream-side surface locates upstream from a radially inner part of the upstream-side surface with respect to the rotary direction of the fan.

22. The portable electric cutting device according to claim 21, wherein the upstream-side surface of any of the division wall extends at an angle with respect to the radial direction of the rotary shaft of the fan such that a radially outer part of the upstream-side surface locates upstream from a radially inner part of the upstream-side surface with respect to the rotary direction of the fan.

23. The portable electric cutting device according to claim 21, wherein the upstream-side surface of any of the division walls extends at the angle of 45 degree relative to the radial direction of the rotary shaft of the fan.

24. The portable electric cutting device according to claim 11, wherein the saw cover further includes another partition wall disposed between the housing and the saw blade housing section, the another partition wall extending at an angle with respect to the cutting direction such that the another partition wall is closer to the saw blade toward a radially outer end with respect to a radial direction of a rotary shaft of the fan.

25. The portable electric cutting device according to claim 24, wherein the division walls extend toward the opening formed in the base.

26. The portable electric cutting device according to claim 11, further comprising an air-blow regulating mechanism that selectively regulates the amount of fanned air that is discharged from the front end of the base through the first groove.

27. The portable electric cutting device according to claim 26, wherein the air-blow regulating mechanism is provided to the base.

28. The portable electric cutting device according to claim 27, wherein:
- the bottom surface of the base is further formed with a guide groove that is in fluid communication with the first groove, the guide groove having substantially the same depth as the first groove; and
- the air-blow regulating mechanism includes a shield member that is disposed in the guide groove, the shield member being slidable along the guide groove between a shield position where the shield member closes the first groove and a non-shield position where the shield member opens the first groove.

29. The electric portable cutting device according to claim 28, wherein the air-blow regulating mechanism further includes a fixing member that selectively fixes and releases the shield member to and from a desired position.

30. The electric portable cutting device according to claim 26, wherein:
- the base is formed with a guide hole penetrating through the base, the guide hole being in fluid communication with the first groove;
- the air-blow regulating mechanism includes a shield member and a positioning member;
- the shield member is inserted into the guide hole and slides along the guide hole between a shield position where the shield member closes the first groove and a non-shield position where the shield member opens the first groove; and
- the positioning member supports the shield member and positions the shield member to a desired position.

31. The electric portable cutting device according to claim 26, wherein:
- the air-blow regulating mechanism includes a shield member and an attaching member, the shield member having a shield side and a non-shield side, the attaching member detachably attaches the shield member to the base selectively with the shield side facing toward the bottom surface of the base and with the non-shield side facing toward the bottom surface of the base;
- the shield member has a shield portion disposed on the shield side that closes the first groove when the shield member is attached to the base with the shield side facing toward the bottom surface, the shield portion having a width substantially equal to a width of the first groove with respect to a direction perpendicular to the cutting direction; and the shield member is formed with a second groove at the non-shield side, the second groove being in fluid communication with the first groove when the shield member is attached to the base with the non-shield side facing toward the bottom surface, allowing the fanned air to pass through the second groove and the first groove.

32. The portable electric cutting device according to claim 24, wherein an air-blow regulating mechanism is provided to the saw cover.

33. The portable electric cutting device according to claim 32, wherein:
- the saw cover includes a protruding member that protrudes toward the saw blade, the protruding member being formed with a slot extending in a direction perpendicular to the cutting direction;
- the air-blow regulating mechanism includes a shield member that slides along the slot between a shield position on an air path through which the fanned air is introduced into the first groove and a non-shield position off of the air path, wherein the shield member at the shield position prevents the fanned air from entering the first groove; and
- the shield member has an L-shaped cross section having a first sliding part that slides along the protruding member and a second sliding part that slides along the saw cover.

34. The portable electric cutting device according to claim 33, wherein the air-blow regulating mechanism further includes a fixing member that selectively fixes and releases the shield member to and from a desired position.

35. The portable electric cutting device according to claim 32, wherein the saw cover is formed with a slot extending in the cutting direction, and the air-blow regulating mechanism includes a shield member that slides along the slot between a shield position where the shield member covers the fanned air discharge ports and a non-shield position where the shield member uncovers the fanned air discharge ports.

36. The portable electric cutting device according to claim 35, wherein the air-blow regulating mechanism further includes a fixing member that selectively fixes and releases the shield member to and from a desired position.

37. The portable electric cutting device according to claim 32, wherein:
- the saw cover is formed with a recess through which the fanned air is directed to the first groove;
- the saw cover is formed with a slot; and
- the air-blow regulating mechanism includes a shield member that slides along the slot between a shield position where the shield member closes the recess and a non-shield position where the shield member opens the recess.

38. The portable electric cutting device according to claim 37, wherein the air-blow regulating mechanism further includes a fixing member that selectively fixes and releases the shield member to and from a desired position.

* * * * *